US011368560B2

(12) United States Patent
Masputra et al.

(10) Patent No.: US 11,368,560 B2
(45) Date of Patent: Jun. 21, 2022

(54) METHODS AND APPARATUS FOR SELF-TUNING OPERATION WITHIN USER SPACE STACK ARCHITECTURES

(71) Applicant: Apple Inc., Cupertino, CA (US)

(72) Inventors: Cahya Adiansyah Masputra, San Jose, CA (US); Karan Sanghi, Cupertino, CA (US); Mingzhe Zhang, Cupertino, CA (US); Jason McElrath, Cupertino, CA (US); Sandeep Nair, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1 day.

(21) Appl. No.: 16/368,214

(22) Filed: Mar. 28, 2019

(65) Prior Publication Data

US 2019/0303222 A1     Oct. 3, 2019

Related U.S. Application Data

(60) Provisional application No. 62/649,509, filed on Mar. 28, 2018.

(51) Int. Cl.
*G06F 7/02*     (2006.01)
*H04L 69/16*     (2022.01)
(Continued)

(52) U.S. Cl.
CPC .......... *H04L 69/162* (2013.01); *G06F 3/0604* (2013.01); *G06F 3/0631* (2013.01);
(Continued)

(58) Field of Classification Search
CPC ............... H04L 69/162; G06F 16/2228; G06F 16/2365; G06F 3/0604
See application file for complete search history.

(56) References Cited

U.S. PATENT DOCUMENTS 5,367,688 A    11/1994    Croll
6,032,179 A     2/2000    Osborne
(Continued)

OTHER PUBLICATIONS

R. Gopalakrishnan et al. "Efficient User-Space Protocol Implementations with QoS Guarantees Using Real-Time Upcalls" (Year: 1998).*

*Primary Examiner* — Charles E Anya
*Assistant Examiner* — Abdou K Seye
(74) *Attorney, Agent, or Firm* — Sterne, Kessler, Goldstein & Fox P.L.L.C.

(57)     ABSTRACT

Methods and apparatus for efficient data transfer within a user space network stack. Unlike prior art monolithic networking stacks, the exemplary networking stack architecture described hereinafter includes various components that span multiple domains (both in-kernel, and non-kernel). For example, unlike traditional "socket" based communication, disclosed embodiments can transfer data directly between the kernel and user space domains. Direct transfer reduces the per-byte and per-packet costs relative to socket based communication. A user space networking stack is disclosed that enables extensible, cross-platform-capable, user space control of the networking protocol stack functionality. The user space networking stack facilitates tighter integration between the protocol layers (including TLS) and the application or daemon. Exemplary systems can support multiple networking protocol stack instances (including an in-kernel traditional network stack).

25 Claims, 15 Drawing Sheets

(51) Int. Cl.

| | | |
|---|---|---|
| *H04L 69/163* | (2022.01) | |
| *H04L 69/164* | (2022.01) | |
| *H04L 12/46* | (2006.01) | |
| *G06F 9/54* | (2006.01) | |
| *H04L 9/40* | (2022.01) | |
| *G06F 9/48* | (2006.01) | |
| *G06F 9/50* | (2006.01) | |
| *G06F 12/10* | (2016.01) | |
| *G06F 13/16* | (2006.01) | |
| *G06F 3/06* | (2006.01) | |
| *G06F 9/46* | (2006.01) | |
| *G06F 12/02* | (2006.01) | |
| *H04L 47/2475* | (2022.01) | |
| *H04L 47/2483* | (2022.01) | |
| *H04L 47/6295* | (2022.01) | |
| *H04L 49/00* | (2022.01) | |
| *H04L 49/9047* | (2022.01) | |
| *H04L 69/00* | (2022.01) | |
| *G06F 9/455* | (2018.01) | |
| *H04L 47/193* | (2022.01) | |
| *H04L 47/283* | (2022.01) | |
| *G06F 9/52* | (2006.01) | |
| *H04L 43/0864* | (2022.01) | |
| *G06F 16/23* | (2019.01) | |
| *G06F 21/52* | (2013.01) | |
| *H04L 47/24* | (2022.01) | |
| *H04L 47/30* | (2022.01) | |
| *H04L 47/32* | (2022.01) | |
| *H04L 47/6275* | (2022.01) | |
| *G06F 21/56* | (2013.01) | |
| *H04L 69/22* | (2022.01) | |
| *G06F 16/22* | (2019.01) | |
| *H04L 61/103* | (2022.01) | |
| *H04L 61/2503* | (2022.01) | |
| *H04L 67/146* | (2022.01) | |
| *H04L 69/18* | (2022.01) | |
| *H04L 1/00* | (2006.01) | |

(52) U.S. Cl.
CPC .......... *G06F 3/0644* (2013.01); *G06F 3/0673* (2013.01); *G06F 9/45558* (2013.01); *G06F 9/461* (2013.01); *G06F 9/4881* (2013.01); *G06F 9/5005* (2013.01); *G06F 9/5016* (2013.01); *G06F 9/5022* (2013.01); *G06F 9/52* (2013.01); *G06F 9/542* (2013.01); *G06F 9/545* (2013.01); *G06F 12/023* (2013.01); *G06F 12/10* (2013.01); *G06F 13/1668* (2013.01); *G06F 16/2228* (2019.01); *G06F 16/2365* (2019.01); *G06F 21/52* (2013.01); *G06F 21/568* (2013.01); *H04L 12/4641* (2013.01); *H04L 43/0864* (2013.01); *H04L 47/193* (2013.01); *H04L 47/2458* (2013.01); *H04L 47/2475* (2013.01); *H04L 47/2483* (2013.01); *H04L 47/283* (2013.01); *H04L 47/30* (2013.01); *H04L 47/32* (2013.01); *H04L 47/6275* (2013.01); *H04L 47/6295* (2013.01); *H04L 49/30* (2013.01); *H04L 49/9052* (2013.01); *H04L 61/103* (2013.01); *H04L 61/2542* (2013.01); *H04L 63/166* (2013.01); *H04L 67/146* (2013.01); *H04L 69/02* (2013.01); *H04L 69/161* (2013.01); *H04L 69/163* (2013.01); *H04L 69/164* (2013.01); *H04L 69/18* (2013.01); *H04L 69/22* (2013.01); *G06F 9/50* (2013.01); *G06F 2009/45595* (2013.01); *G06F 2209/5011* (2013.01); *G06F 2212/657* (2013.01); *G06F 2221/032* (2013.01); *G06F 2221/034* (2013.01); *H04L 1/0061* (2013.01)

(56) References Cited

U.S. PATENT DOCUMENTS

| | | | |
|---|---|---|---|
| 7,100,020 | B1 | 8/2006 | Brightman et al. |
| 7,152,231 | B1 | 12/2006 | Galluscio et al. |
| 7,398,382 | B2 | 7/2008 | Rothman et al. |
| 7,403,542 | B1 | 7/2008 | Thompson |
| 7,506,084 | B2 | 3/2009 | Moerti et al. |
| 7,587,575 | B2 | 9/2009 | Moertl et al. |
| 7,590,817 | B2 | 9/2009 | Moertl et al. |
| 7,617,377 | B2 | 11/2009 | Moertl et al. |
| 7,941,682 | B2 | 5/2011 | Adams |
| 8,214,707 | B2 * | 7/2012 | Munson ............... H04L 1/0002 370/394 |
| 8,230,248 | B2 | 7/2012 | Dance et al. |
| 8,255,725 | B2 | 8/2012 | Shimazaki et al. |
| 8,352,624 | B2 | 1/2013 | Zimmerman et al. |
| 8,555,099 | B2 | 10/2013 | Marinkovic et al. |
| 8,769,168 | B2 | 7/2014 | Moertl et al. |
| 9,049,179 | B2 | 6/2015 | Luna |
| 9,170,957 | B2 | 10/2015 | Touzni et al. |
| 9,280,360 | B2 | 3/2016 | Xu et al. |
| 9,594,718 | B2 | 3/2017 | Kaushik et al. |
| 9,959,124 | B1 | 5/2018 | Herbeck et al. |
| 9,985,904 | B2 | 5/2018 | Shalev et al. |
| 10,230,608 | B2 | 3/2019 | Tsirkin |
| 10,331,600 | B1 | 6/2019 | Rajadnya et al. |
| 10,534,601 | B1 | 1/2020 | Venkata et al. |
| 10,999,132 | B1 * | 5/2021 | Sagar ..................... H04L 43/16 |
| 2001/0037410 | A1 | 11/2001 | Gardner |
| 2002/0053011 | A1 | 5/2002 | Aiken et al. |
| 2002/0169938 | A1 | 11/2002 | Scott et al. |
| 2003/0061395 | A1 | 3/2003 | Kingsbury et al. |
| 2004/0010545 | A1 | 1/2004 | Pandya |
| 2005/0138628 | A1 * | 6/2005 | Bradford ............... G06F 9/3802 718/107 |
| 2006/0075119 | A1 | 4/2006 | Hussain et al. |
| 2006/0136570 | A1 | 6/2006 | Pandya |
| 2007/0008983 | A1 * | 1/2007 | Van Doren ............. G06F 9/461 370/412 |
| 2007/0226375 | A1 * | 9/2007 | Chu ....................... H04L 47/10 709/250 |
| 2007/0255802 | A1 | 11/2007 | Aloni et al. |
| 2008/0005794 | A1 | 1/2008 | Inoue et al. |
| 2008/0127292 | A1 | 5/2008 | Cooper et al. |
| 2008/0148291 | A1 | 6/2008 | Huang et al. |
| 2009/0172674 | A1 * | 7/2009 | Bobak ................. G06F 11/1482 718/101 |
| 2009/0240874 | A1 | 9/2009 | Pong |
| 2010/0005014 | A1 | 1/2010 | Castle et al. |
| 2010/0017655 | A1 | 1/2010 | Gooding et al. |
| 2010/0049876 | A1 | 2/2010 | Pope et al. |
| 2010/0118041 | A1 | 5/2010 | Chen et al. |
| 2011/0035575 | A1 | 2/2011 | Kwon et al. |
| 2011/0083002 | A1 | 4/2011 | Albers et al. |
| 2011/0219208 | A1 | 9/2011 | Asaad et al. |
| 2011/0246742 | A1 | 10/2011 | Kogen et al. |
| 2012/0036334 | A1 | 2/2012 | Horman et al. |
| 2012/0260017 | A1 | 10/2012 | Mine et al. |
| 2013/0067188 | A1 | 3/2013 | Mehra et al. |
| 2013/0204927 | A1 | 8/2013 | Kruglikov et al. |
| 2013/0205113 | A1 | 8/2013 | Ahmad et al. |
| 2013/0275976 | A1 | 10/2013 | Dawson et al. |
| 2014/0068624 | A1 | 3/2014 | Fuller et al. |
| 2014/0068636 | A1 | 3/2014 | Dupont et al. |
| 2014/0122695 | A1 | 5/2014 | Kulikov et al. |
| 2014/0189057 | A1 | 7/2014 | Sankoda et al. |
| 2014/0355606 | A1 | 12/2014 | Riddoch et al. |
| 2015/0081985 | A1 | 3/2015 | Archer et al. |
| 2015/0156122 | A1 | 6/2015 | Singh et al. |
| 2015/0172345 | A1 | 6/2015 | Mantin et al. |
| 2015/0244804 | A1 | 8/2015 | Warfield et al. |
| 2015/0261588 | A1 | 9/2015 | Liu et al. |

(56) References Cited

U.S. PATENT DOCUMENTS

| | | |
|---|---|---|
| 2015/0326542 A1 | 11/2015 | Serebrin |
| 2015/0363110 A1 | 12/2015 | Batra et al. |
| 2016/0103480 A1 | 4/2016 | Sanghi et al. |
| 2016/0226957 A1 | 8/2016 | Zhang et al. |
| 2016/0357443 A1* | 12/2016 | Li .................... G06F 3/065 |
| 2016/0378545 A1 | 12/2016 | Ho |
| 2017/0075856 A1 | 3/2017 | Suzue et al. |
| 2017/0111283 A1* | 4/2017 | Kumar .................... H04L 47/18 |
| 2017/0147282 A1 | 5/2017 | Seo |
| 2017/0149890 A1 | 5/2017 | Shamis et al. |
| 2017/0187621 A1 | 6/2017 | Shalev et al. |
| 2017/0187846 A1 | 6/2017 | Shalev et al. |
| 2017/0264497 A1 | 9/2017 | Lim |
| 2017/0286322 A1 | 10/2017 | Garg et al. |
| 2017/0337588 A1 | 11/2017 | Chittilappilly et al. |
| 2017/0371591 A1 | 12/2017 | Xia et al. |
| 2018/0004690 A1 | 1/2018 | Kaminski et al. |
| 2018/0239657 A1 | 8/2018 | Petrbok et al. |
| 2018/0295052 A1 | 10/2018 | St-Laurent |
| 2018/0357176 A1 | 12/2018 | Wang |
| 2019/0036893 A1 | 1/2019 | Jiang |
| 2019/0097938 A1 | 3/2019 | Talla et al. |
| 2019/0102303 A1 | 4/2019 | Wang et al. |
| 2019/0102568 A1 | 4/2019 | Hausauer et al. |
| 2019/0109714 A1 | 4/2019 | Clark et al. |
| 2019/0141041 A1 | 5/2019 | Bhabbur et al. |
| 2019/0147066 A1 | 5/2019 | Ben Dayan et al. |
| 2019/0147069 A1 | 5/2019 | Ben Dayan et al. |
| 2019/0205533 A1 | 7/2019 | Diehl et al. |
| 2019/0213044 A1 | 7/2019 | Cui et al. |
| 2019/0253351 A1 | 8/2019 | Ihlar et al. |
| 2020/0036615 A1* | 1/2020 | Lewis .................... H04L 63/02 |

* cited by examiner

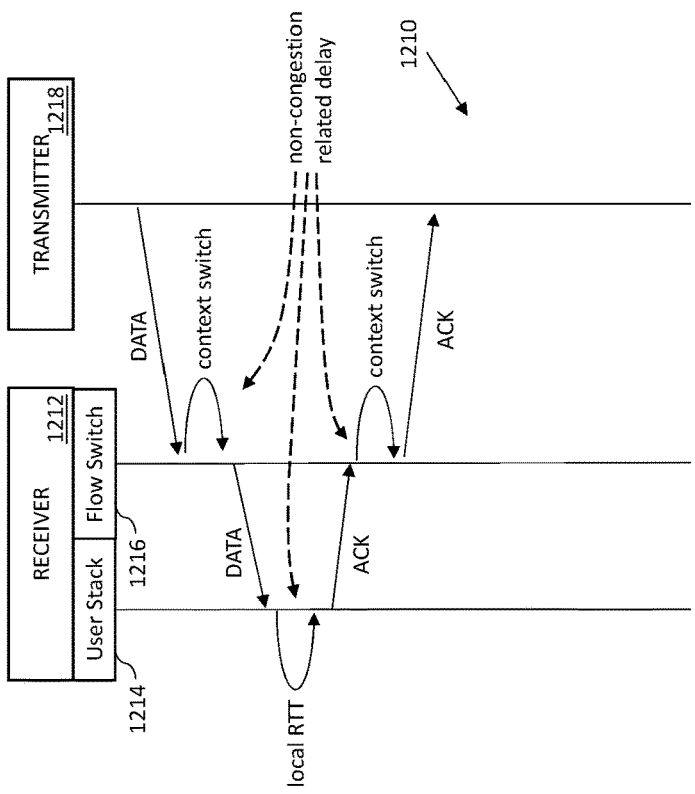
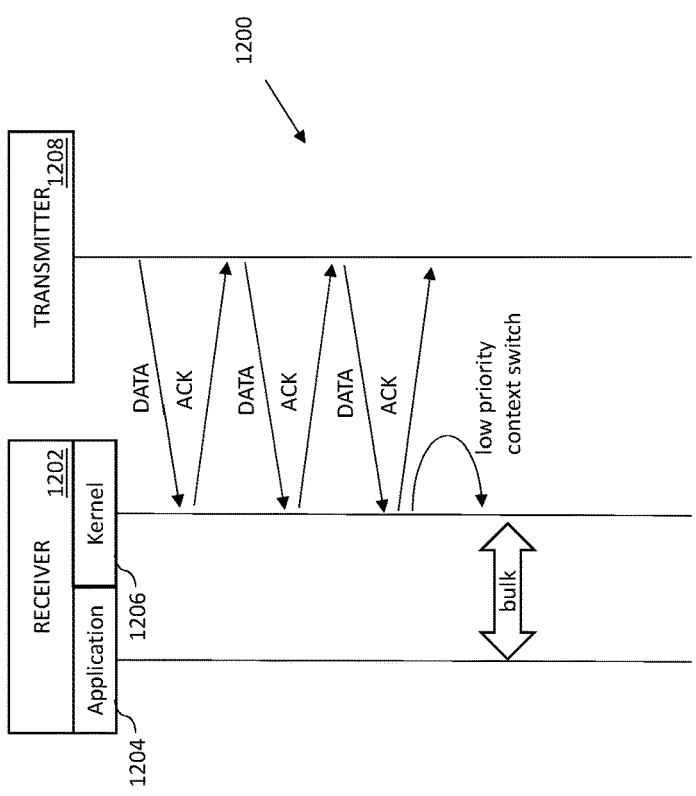
FIG. 12

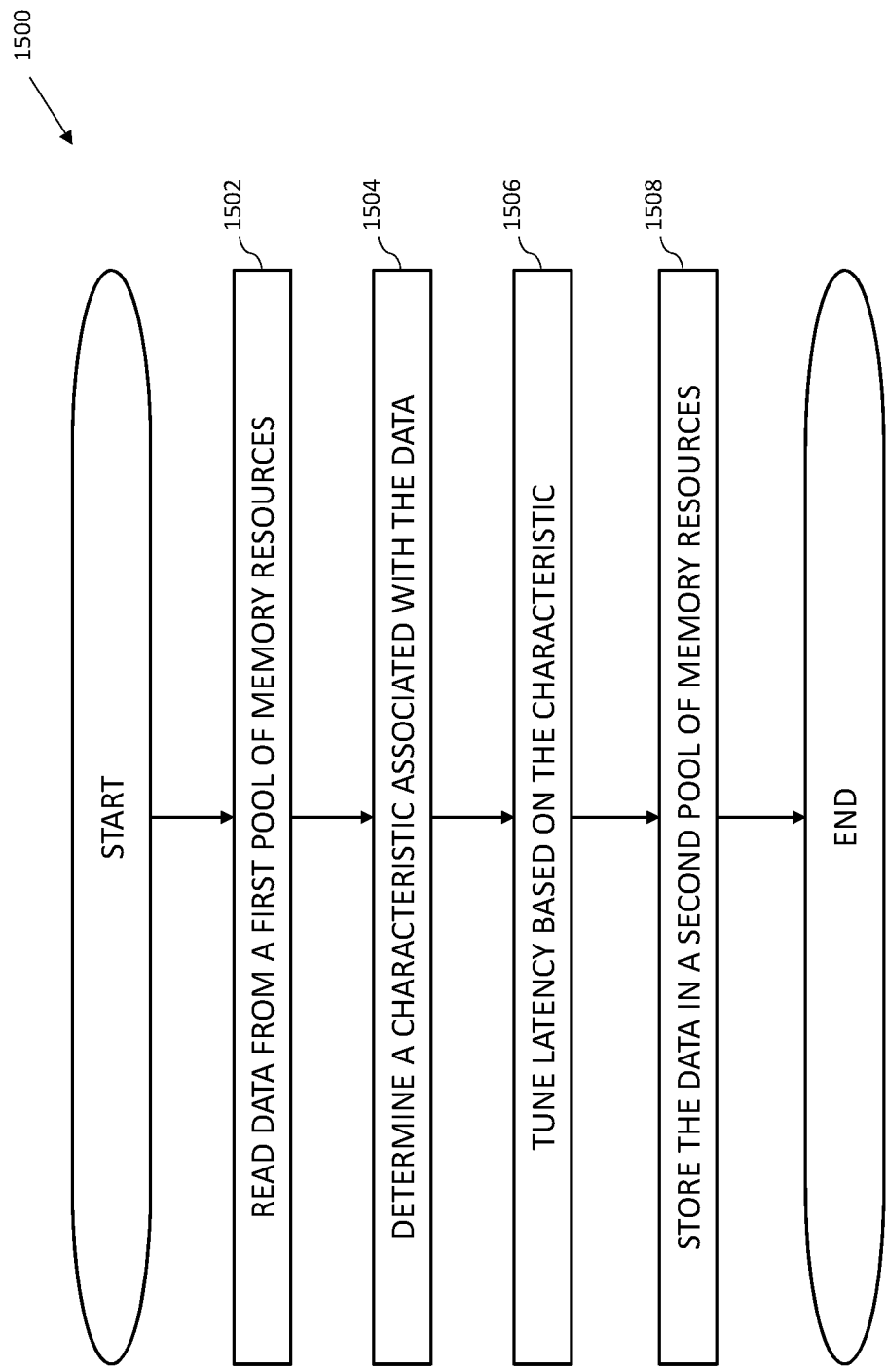

METHODS AND APPARATUS FOR SELF-TUNING OPERATION WITHIN USER SPACE STACK ARCHITECTURES

PRIORITY

This application claims the benefit of priority to U.S. Provisional Patent Application Ser. No. 62/649,509 filed Mar. 28, 2018 and entitled "METHODS AND APPARATUS FOR EFFICIENT DATA TRANSFER WITHIN USER SPACE NETWORKING STACK INFRASTRUCTURES", which is incorporated herein by reference in its entirety.

RELATED APPLICATIONS

This application is related to U.S. patent application Ser. No. 16/144,992 filed Sep. 27, 2018 and entitled "Methods and Apparatus for Single Entity Buffer Pool Management", U.S. patent application Ser. No. 16/146,533 filed Sep. 28, 2018 and entitled "Methods and Apparatus for Regulating Networking Traffic in Bursty System Conditions", U.S. patent application Ser. No. 16/146,324 filed Sep. 28, 2018 and entitled "Methods and Apparatus for Preventing Packet Spoofing with User Space Communication Stacks", U.S. patent application Ser. No. 16/146,916 filed Sep. 28, 2018 and entitled "Methods and Apparatus for Channel Defunct Within User Space Stack Architectures", U.S. patent application Ser. No. 16/236,032 filed Dec. 28, 2018 and entitled "Methods and Apparatus for Classification of Flow Metadata with User Space Communication Stacks", U.S. patent application Ser. No. 16/363,495 filed Mar. 25, 2019 and entitled "Methods and Apparatus for Dynamic Packet Pool Configuration in Networking Stack Infrastructures", U.S. patent application Ser. No. 16/365,462 filed Mar. 26, 2019 and entitled "Methods and Apparatus for Sharing and Arbitration of Host Stack Information with User Space Communication Stacks", U.S. patent application Ser. No. 16/365,484 filed Mar. 26, 2019 and entitled "Methods and Apparatus for Virtualized Hardware Optimizations for User Space Networking", U.S. patent application Ser. No. 16/368,368, filed concurrently herewith on Mar. 28, 2019 and entitled "Methods and Apparatus for Secure Operation of User Space Communication Stacks", U.S. patent application Ser. No. 16/368,396, filed concurrently herewith on Mar. 28, 2019 and entitled "Methods and Apparatus for Memory Allocation and Reallocation in Networking Stack Infrastructures", and U.S. patent application Ser. No. 16/368,338, filed concurrently herewith on Mar. 28, 2019 and entitled "Methods and Apparatus for Active Queue Management in User Space Networking", each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

1. Technical Field

The disclosure relates generally to the field of electronic devices, as well as networks thereof. More particularly, the disclosure is directed to methods and apparatus for implementing computerized networking stack infrastructures. Various aspects of the present disclosure are directed to, in one exemplary aspect, data transfer within user space networking stack infrastructures.

2. Description of Related Technology

The consumer electronics industry has seen explosive growth in network connectivity; for example, Internet connectivity is now virtually ubiquitous across many different device types for a variety of different applications and functionalities. The successful implementation of network connectivity over a myriad of different usage cases has been enabled by, inter alia, the principles of modular design and abstraction. Specifically, the traditional network communication paradigm incorporates multiple (generally) modular software "layers" into a "communication stack." Each layer of the communication stack separately manages its own implementation specific considerations, and provides an "abstracted" communication interface to the next layer. In this manner, different applications can communicate freely across different devices without considering the underlying network transport.

The traditional network communication paradigm has been relatively stable for over 30 years. The Assignee hereof has developed its own implementation of a computer networking stack (based on the traditional networking paradigm) that is mature, robust, and feature-rich (yet conservative). This networking stack is the foundation for virtually all networking capabilities, including those used across the Assignee's products (e.g., MacBook®, iMac®, iPad®, and iPhone®, etc.) and has been designed to handle a variety of protocols (such as TCP (Transmission Control Protocol), UDP (User Datagram Protocol) and IP (Internet Protocol)), and proprietary extensions and functionalities.

While the traditional network communication paradigm has many benefits, changes in the commercial landscape have stretched the capabilities of the existing implementations. Over the past years new use cases have emerged that require capabilities beyond those of the traditional networking stack design. For example, some use cases require control and data movement operations to be performed in so-called "user space" (software that is executed outside the kernel, and specific to a user process). Common examples of such applications include without limitation e.g. Virtual Private Networks (VPN), application proxy, content and traffic filtering, and any number of other network-aware user applications.

Furthermore, certain types of user applications (e.g., media playback, real-time or interactive network applications) would benefit from workload-specific customizations and performance optimizations of the networking stack.

Unfortunately, the current one-size-fits-all networking stack was not designed for (and is thus ill-suited to) the requirements of the aforementioned use cases (and others contemplated herein). More directly, supporting user space applications and associated components from within the traditional in-kernel networking stack architecture adds complexity, increases technical debts (the implied cost of rework attributed to deploying a faster, but suboptimal, implementation), brings in higher processing costs, and results in suboptimal performance and higher power consumption.

To these ends, a networking stack architecture and technology that caters to emerging non-kernel use cases is needed. Ideally, but not as a requisite, such solutions should preserve backwards compatibility with the traditional in-kernel networking stack.

More generally, improved methods and apparatus for manipulating and/or controlling lower layer networking communication protocols by higher layer software applications is desired.

SUMMARY

The present disclosure satisfies the foregoing needs by providing, inter alia, methods and apparatus for data transfer within user space networking stack infrastructures.

In one aspect, a method for user space latency optimizations with user space networking stacks is disclosed. In one embodiment, the method includes: reading data from a first pool of resources; determining a characteristic of the read data; based on the characteristic of the read data, tuning a latency associated with data processing; and storing the read data in a second pool of resources in accordance with the tuned latency.

In one variant, determining the characteristic of the read data comprises determining a size of the read data.

In one variant, determining the characteristic of the read data comprises determining a rate at which the read data was received at the first pool of resources.

In one variant, determining the characteristic of the read data comprises determining an estimated round-trip time (RTT) for processing the read data in user space.

In one variant, determining the characteristic of the read data comprises determining a time at which the read data was received at the first pool of resources.

In one variant, tuning the latency associated with data processing comprises batching a subset of the read data to be processed together in user space. In one such variant, the method further includes recording an amount of the read data that is batched. In one such case, the method includes recording a performance metric associated with the recorded amount.

In one variant, tuning the latency associated with data processing comprises tuning a scheduling priority for processing the read data in user space.

In one variant, tuning the latency associated with data processing comprises decreasing a scheduling priority for processing the data in user space.

In one aspect, a system configured for user space latency optimizations with user space networking stacks is disclosed. In one embodiment, the system includes: an application that comprises a user space networking stack; a first pool of dedicated memory resources for the application; a second pool of dedicated memory resources for a kernel space application; a processor in data communication with the first pool of dedicated memory resources and the second pool of dedicated memory resources; and a kernel space flow switch in data communication with the processor, the kernel space flow switch configured to: read data from the second pool of dedicated memory resources; obtain a characteristic of the read data; based on the characteristic of the read data, tune an operation associated with the read data; and store the read data in the first pool of dedicated memory resources.

In one variant, the processor comprises one or more cores. In one such variant, the one or more cores are characterized by different performance characteristics. In another such variant, each one of the one or more cores comprises a dynamic frequency control capability. In still another variant, the system also includes a scheduler in data communication with the one or more cores, the scheduler configured to allocate instructions to be run by each one of the one or more cores. In yet another variant, the system includes a kernel space logical entity, the kernel space logical entity configured to schedule tasks for each one of the one or more cores.

In one aspect, a non-transitory computer readable apparatus is disclosed. In one embodiment, the non-transitory computer readable apparatus includes a storage medium having one or more computer programs stored thereon, the one or more computer programs, when executed by a processing apparatus, configured to: read data from a first pool of resources; obtain a characteristic of the read data; modify the read data based on the characteristic; and store the modified read data in a second pool of resources.

In one variant, the first pool of resources is in kernel space.

In one variant, the characteristic includes a local processing time.

In one variant, the modified read data is to be processed in user space.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIG. 12 is a logical representation of the exemplary data processing in a legacy BSD networking operation and the exemplary data processing in a user space networking operation, useful for explaining various aspects of the present disclosure.

FIG. 15 is a logical flow diagram illustrating a generalized method for using the system of, for example, FIGS. 11 and 14, in accordance with various aspects of the present disclosure.

All figures © Copyright 2017-2019 Apple Inc. All rights reserved.

DETAILED DESCRIPTION

Reference is now made to the drawings, wherein like numerals refer to like parts throughout.

Detailed Description of Exemplary Embodiments

Exemplary embodiments of the present disclosure are now described in detail. While embodiments are primarily discussed in the context of use in conjunction with an inter-processor communication (IPC) link such as that described in, for example, commonly owned U.S. patent application Ser. No. 14/879,024 filed Oct. 8, 2015 and entitled "METHODS AND APPARATUS FOR RUNNING AND BOOTING AN INTER-PROCESSOR COMMUNICATION LINK BETWEEN INDEPENDENTLY OPERABLE PROCESSORS", now U.S. Pat. No. 10,078,361, and co-owned and co-pending U.S. patent application Ser. No. 16/112,480 filed Aug. 24, 2018 and entitled "METHODS AND APPARATUS FOR CONTROL OF A JOINTLY SHARED MEMORY-MAPPED REGION", each of which being incorporated herein by reference in its entirety, it will be recognized by those of ordinary skill that the present disclosure is not so limited.

Existing Network Socket Technologies—

Figure 1:
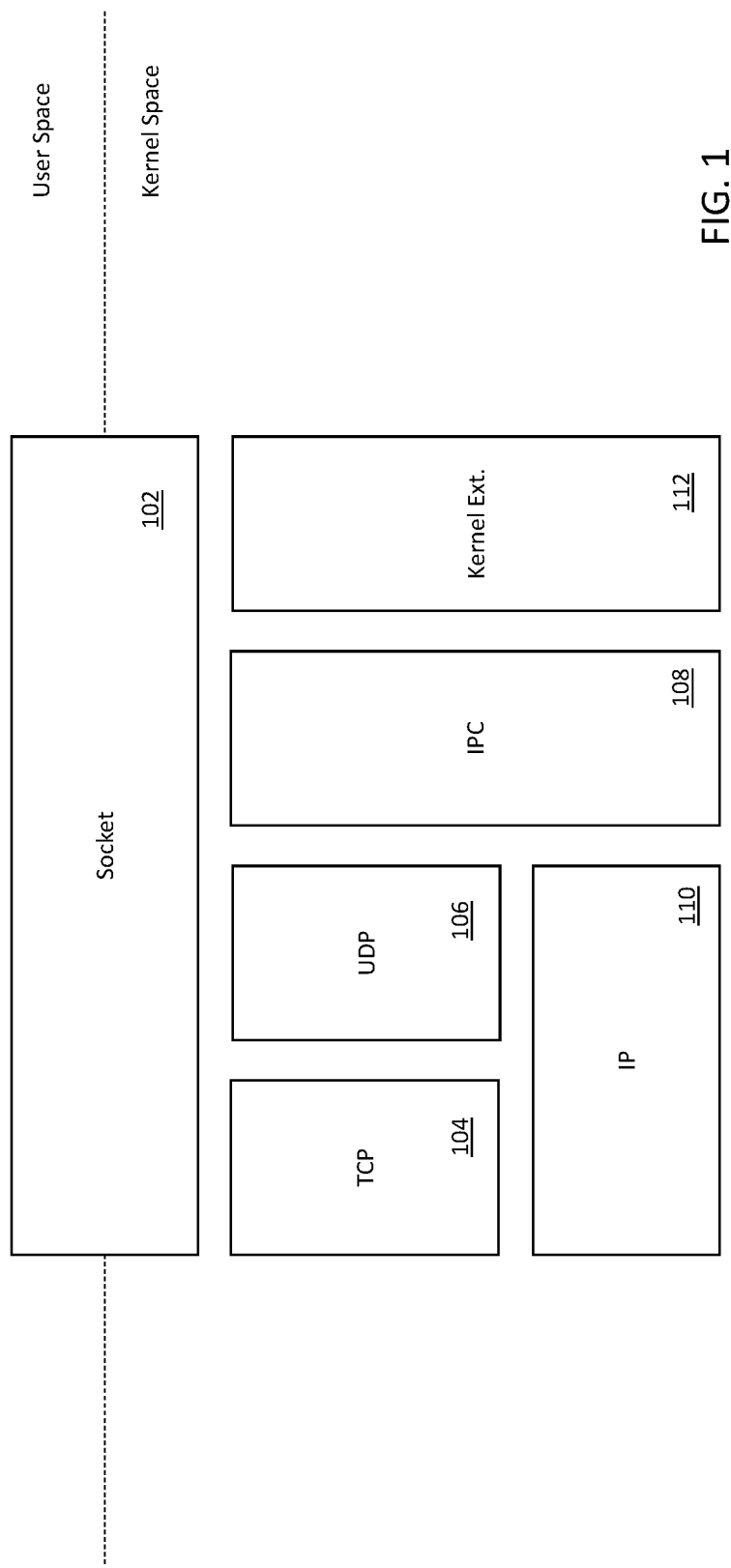
FIG. 1 is a logical representation of a traditional network socket, useful for explaining various aspects of the present disclosure.

FIG. 1 illustrates one logical representation of a traditional network socket 102, useful for explaining various aspects of the traditional networking interface. A network "socket" is a virtualized internal network endpoint for sending or receiving data at a single node in a computer network. A network socket may be created ("opened") or destroyed ("closed") and the manifest of network sockets may be stored as entries in a network resource table which may additionally include reference to various communication protocols (e.g., Transmission Control Protocol (TCP) 104, User Datagram Protocol (UDP) 106, Inter-Processor Communication (IPC) 108, etc.), destination, status, and any other operational processes (kernel extensions 112) and/or parameters); more generally, network sockets are a form of system resource.

As shown in FIG. 1, the socket 102 provides an application programming interface (API) that spans between the user space and the kernel space. An API is a set of clearly defined methods of communication between various software components. An API specification commonly includes, without limitation: routines, data structures, object classes, variables, remote calls and/or any number of other software constructs commonly defined within the computing arts.

As a brief aside, user space is a portion of system memory that a processor executes user processes from. User space is relatively freely and dynamically allocated for application software and a few device drivers. The kernel space is a portion of memory that a processor executes the kernel from. Kernel space is strictly reserved (usually during the processor boot sequence) for running privileged operating system (O/S) processes, extensions, and most device drivers. For example, each user space process normally runs in a specific memory space (its own "sandbox"), and cannot access the memory of other processes unless explicitly allowed. In contrast, the kernel is the core of a computer's operating system; the kernel can exert complete control over all other processes in the system.

The term "operating system" may refer to software that controls and manages access to hardware. An O/S commonly supports processing functions such as e.g., task scheduling, application execution, input and output management, memory management, security, and peripheral access. As used herein, the term "application" refers to software that can interact with the hardware only via procedures and interfaces offered by the O/S.

The term "privilege" may refer to any access restriction or permission which restricts or permits processor execution. System privileges are commonly used within the computing arts to, inter alia, mitigate the potential damage of a computer security vulnerability. For instance, a properly privileged computer system will prevent malicious software applications from affecting data and task execution associated with other applications and the kernel.

As used herein, the term "in-kernel" and/or "kernel space" may refer to data and/or processes that are stored in, and/or have privilege to access to, the kernel space memory allocations. In contrast, the terms "non-kernel" and/or "user space" refers to data and/or processes that are not privileged to access the kernel space memory allocations. In particular, user space represents the address space specific to the user process, whereas non-kernel space represents address space which is not in-kernel, but which may or may not be specific to user processes.

As previously noted, the illustrated socket 102 provides access to Transmission Control Protocol (TCP) 104, User Datagram Protocol (UDP) 106, and Inter-Processor Communication (IPC) 108. TCP, UDP, and IPC are various suites of transmission protocols each offering different capabilities and/or functionalities. For example, UDP is a minimal message-oriented encapsulation protocol that provides no guarantees to the upper layer protocol for message delivery and the UDP layer retains no state of UDP messages once sent. UDP is commonly used for real-time, interactive applications (e.g., video chat, voice over IP (VoIP)) where loss of packets is acceptable. In contrast, TCP provides reliable, ordered, and error-checked delivery of data via a retransmission and acknowledgement scheme; TCP is generally used for file transfers where packet loss is unacceptable, and transmission latency is flexible.

As used herein, the term "encapsulation protocol" may refer to modular communication protocols in which logically separate functions in the network are abstracted from their underlying structures by inclusion or information hiding within higher level objects. For example, in one exemplary embodiment, UDP provides extra information (ports numbering).

As used herein, the term "transport protocol" may refer to communication protocols that transport data between logical endpoints. A transport protocol may include encapsulation protocol functionality.

Both TCP and UDP are commonly layered over an Internet Protocol (IP) 110 for transmission. IP is a connectionless protocol for use on packet-switched networks that provides a "best effort delivery". Best effort delivery does not guarantee delivery, nor does it assure proper sequencing or avoidance of duplicate delivery. Generally these aspects are addressed by TCP or another transport protocol based on UDP.

As a brief aside, consider a web browser that opens a webpage; the web browser application would generally open a number of network sockets to download and/or interact with the various digital assets of the webpage (e.g., for a relatively common place webpage, this could entail instantiating~300 sockets). The web browser can write (or read) data to the socket; thereafter, the socket object executes system calls within kernel space to copy (or fetch) data to data structures in the kernel space.

As used herein, the term "domain" may refer to a self-contained memory allocation e.g., user space, kernel space. A "domain crossing" may refer to a transaction, event, or process that "crosses" from one domain to another domain. For example, writing to a network socket from the user space to the kernel space constitutes a domain crossing access.

In the context of a Berkeley Software Distribution (BSD) based networking implementation, data that is transacted within the kernel space is stored in memory buffers that are also commonly referred to as "mbufs". Each mbuf is a fixed size memory buffer that is used generically for transfers (mbufs are used regardless of the calling process e.g., TCP, UDP, etc.). Arbitrarily sized data can be split into multiple mbufs and retrieved one at a time or (depending on system support) retrieved using "scatter-gather" direct memory access (DMA) ("scatter-gather" refers to the process of gathering data from, or scattering data into, a given set of buffers). Each mbuf transfer is parameterized by a single identified mbuf.

Notably, each socket transfer can create multiple mbuf transfers, where each mbuf transfer copies (or fetches) data from a single mbuf at a time. As a further complication, because the socket spans both: (i) user space (limited privileges) and (ii) kernel space (privileged without limitation), the socket transfer verifies that each mbuf copy into/out of kernel space is valid. More directly, the verification process ensures that the data access is not malicious, corrupted, and/or malformed (i.e., that the transfer is appropriately sized and is to/from an appropriate area).

The processing overhead associated with domain crossing is a non-trivial processing cost. Processing cost affects user experience both directly and indirectly. A processor has a fixed amount of processing cycles every second; thus cycles that are used for transfer verification detract from more user perceptible tasks (e.g., rendering a video or audio stream). Additionally, processor activity consumes power; thus, increases in processing overhead increases power consumption.

Referring back to FIG. 1, in addition to the generic TCP 104, UDP 106, and IPC 108 communication suites, the illustrated socket 102 also may provide access to various kernel extensions 112. A kernel extension is a dynamically loaded bundle of executable code that executes from kernel space. Kernel extensions may be used to perform low-level tasks that cannot be performed in user space. These low-level tasks typically fall into one or more of: low-level device drivers, network filters, and/or file systems. Examples of sockets and/or extensions include without limitation: route (IP route handling), ndrv (packet 802.1X handling), key (key management), unix (translations for Unix systems), kernel control, kernel events, parental controls, intrusion detection, content filtering, hypervisors, and/or any number of other kernel tasking.

Kernel extensions and public APIs enable, for example, $3^{rd}$ party software developers to develop a wide variety of applications that can interact with a computer system at even the lowest layers of abstraction. For example, kernel extensions can enable socket level filtering, IP level filtering, and even device interface filtering. In the current consumer applications space, many emerging technologies now rely on closely coupled interfaces to the hardware and kernel functionality. For example, many security applications "sniff" network traffic to detect malicious traffic or filter undesirable content; this requires access to other application sandboxes (a level of privilege that is normally reserved for the kernel).

Unfortunately, $3^{rd}$ party kernel extensions can be dangerous and/or undesirable. As previously noted, software applications are restricted for security and stability reasons; however the kernel is largely unrestricted. A $3^{rd}$ party kernel extension can introduce instability issues because the 3rd party kernel extensions run in the same address space as the kernel itself (which is outside the purview of traditional memory read/write protections based on memory allocations). Illegal memory accesses can result in segmentation faults and memory corruptions. Furthermore, unsecure kernel extension can create security vulnerabilities that can be exploited by malware. Additionally, even where correctly used, a kernel extension can expose a user's data to the $3^{rd}$ party software developer. This heightened level of access may raise privacy concerns (e.g., the $3^{rd}$ party developer may have access to browsing habits, etc.).

Existing Performance Optimization Technologies—

Figure 2:
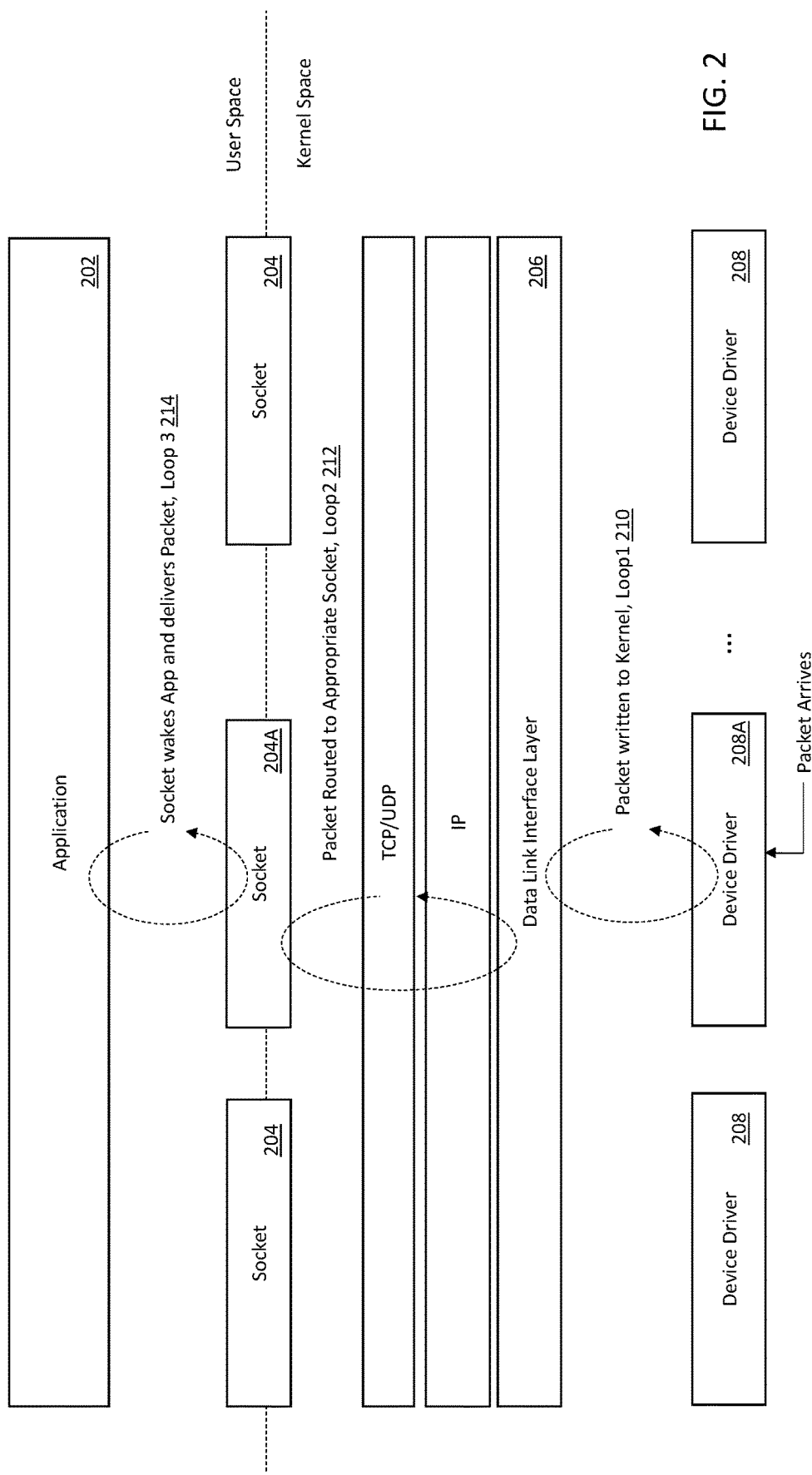
FIG. 2 is a logical representation of a computer system that implements Input/Output (I/O) network control, useful for explaining various aspects of the present disclosure.

FIG. 2 illustrates one logical representation of a computer system that implements Input/Output (I/O) network control, useful for explaining various aspects of traditional network optimization. As depicted therein, a software application 202 executing from user space opens multiple sockets 204 to communicate with e.g., a web server. Each of the sockets interfaces with a Data Link Interface Layer (DLIL) 206.

The DLIL 206 provides a common interface layer to each of the various physical device drivers which will handle the subsequent data transfer (e.g., Ethernet, Wi-Fi, cellular, etc.). The DLIL performs a number of system-wide holistic network traffic management functions. In one such implementation, the DLIL is responsible for BSD Virtual Interfaces, IOKit Interfaces (e.g., DLIL is the entity by which IOKit based network drivers are connected to the networking stack), Active Queue Management (AQM), flow control and advisory action, etc. In most cases, the device driver 208 may be handled by an external device (e.g., a baseband co-processor), thus the DLIL 206 is usually (but not always) the lowest layer of the network communication stack.

During normal operation, the computer system will logically segment its tasks to optimize overall system operation. In particular, a processor will execute a task, and then "context switch" to another task, thereby ensuring that any single process thread does not monopolize processor resources from start to finish. More directly, a context switch is the process of storing the state of a process, or of a thread, so that it can be restored and execution resumed from the same point later. This allows multiple processes to share a single processor. However, excessive amounts of context switching can slow processor performance down. Notably, while the present discussion is primarily discussed within the context of a single processor for ease of understanding, multi-processor systems have analogous concepts (e.g., multiple processors also perform context switching, although contexts may not necessarily be resumed by the same processor).

For example, consider the following example of a packet reception. Packets arrive at the device driver 208A. The hardware managed by the device driver 208A may notify the processor via e.g., a doorbell signal (e.g., an interrupt). The device driver 208A work loop thread handles the hardware interrupt/doorbell, then signals the DLIL thread (Loop 1 210). The processor services the device driver 208A with high priority, thereby ensuring that the device driver 208A operation is not bottlenecked (e.g., that the data does not overflow the device driver's memory and/or that the device driver does not stall). Once the data has been moved out of the device driver, the processor can context switch to other tasks.

At a later point, the processor can pick up the DLIL 206 execution process again. The processor determines which socket the packets should be routed to (e.g., socket 204A) and routes the packet data appropriately (Loop 2 212). During this loop, the DLIL thread takes each packet, and moves each one sequentially into the socket memory space. Again, the processor can context switch to other tasks so as to ensure that the DLIL task does not block other concurrently executed processing.

Subsequently thereafter, when the socket has the complete packet data transfer the processor can wake the user space application and deliver the packet into user space memory (Loop 3 214). Generally, user space applications are treated at lower priority than kernel tasks; this can be reflected by larger time intervals between suspension and resumption. While the foregoing discussion is presented in the context of packet reception, artisans of ordinary skill in the related arts will readily appreciate, given the contents of the present disclosure, that the process is substantially reversed for packet transmission.

As demonstrated in the foregoing example, context switching ensures that tasks of different processing priority are allocated commensurate amounts of processing time. For example, a processor can spend significantly more time executing tasks of relatively high priority, and service lower priority tasks on an as-needed basis. As a brief aside, human perception is much more forgiving than hardware operation. Consequently, kernel tasks are generally performed at a much higher priority than user space applications. The difference in priority between kernel and user space allows the kernel to handle immediate system management (e.g., hardware interrupts, and queue overflow) in a timely manner, with minimal noticeable impact to the user experience.

Moreover, FIG. 2 is substantially representative of every implementation of the traditional network communications stack. While implementations may vary from this illustrative example, virtually all networking stacks share substantially the same delivery mechanism. The traditional network communications stack schema (such as the BSD architecture and derivatives therefrom) have been very popular for the past 30 years due to its relative stability of implementation and versatility across many different device platforms. For example, the Assignee hereof has developed and implemented the same networking stack across virtually all of its products (e.g., MacBook®, iMac®, iPad®, and iPhone®, Apple Watch®, etc.).

Unfortunately, changing tastes in consumer expectations cannot be effectively addressed with the one-size-fits-all model and the conservative in-kernel traditional networking stack. Artisans of ordinary skill in the related arts will readily appreciate, given the contents of the present disclosure, that different device platforms have different capabilities; for example, a desktop processor has significantly more processing and memory capability than a mobile phone processor. More directly, the "one-size-fits-all" solution does not account for the underlying platform capabilities and/or application requirements, and thus is not optimized for performance. Fine-tuning the traditional networking stack for performance based on various "tailored" special cases results in an inordinate amount of software complexity which is untenable to support across the entire ecosystem of devices.

Emerging Use Cases

Figure 3:
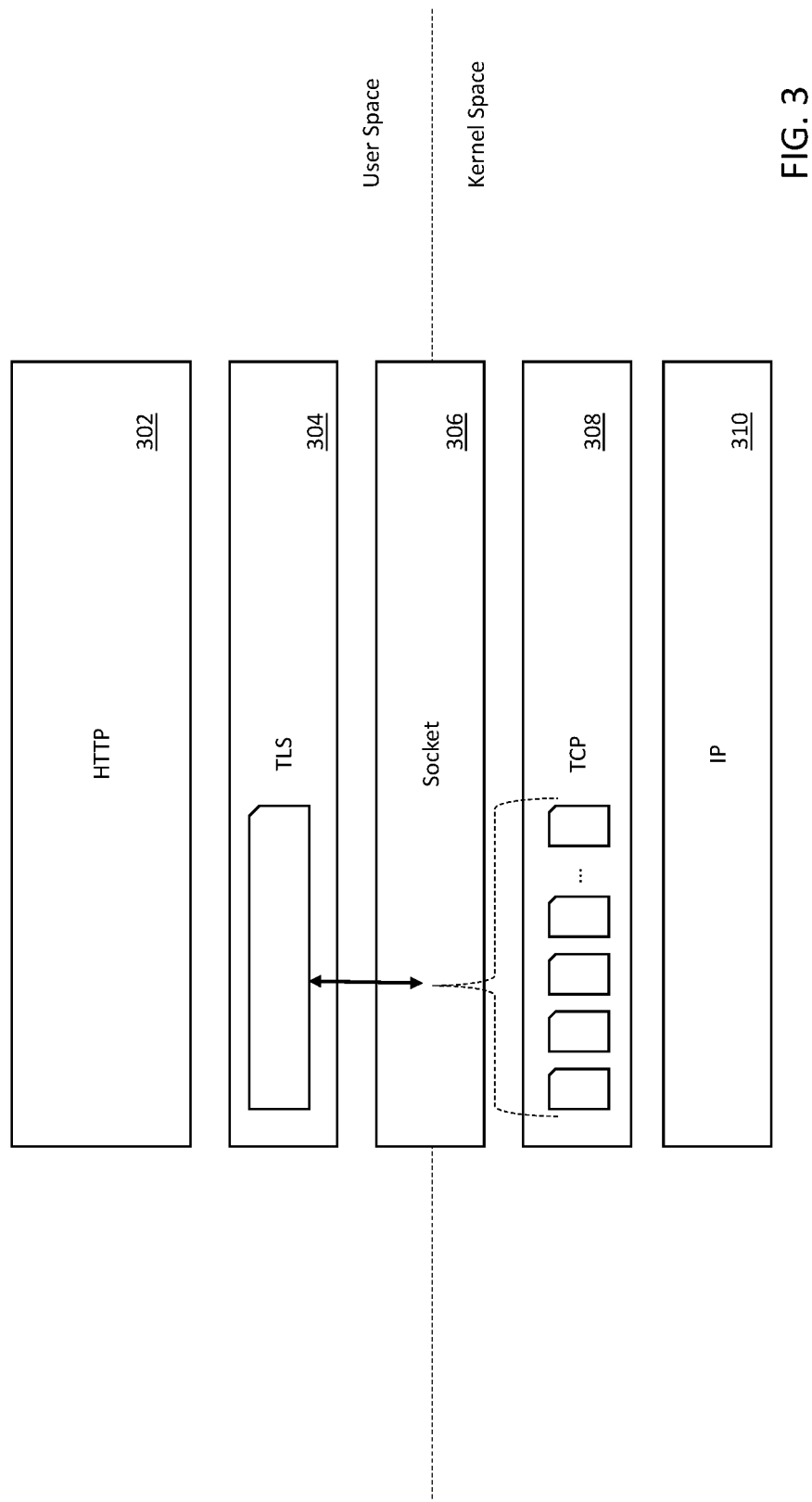
FIG. 3 is a logical block diagram of one exemplary implementation of Transport Layer Security (TLS), useful for explaining various aspects of the present disclosure.

FIG. 3 illustrates a logical block diagram of one exemplary implementation of Transport Layer Security (TLS) (the successor to Secure Sockets Layer (SSL)), useful to explain user/kernel space integration complexities of emerging use cases.

As shown, an application executing from user space can open a Hypertext Transfer Protocol (HTTP) session 302 with a TLS security layer 304 in order to securely transfer data (Application Transport Security (ATS) services) over a network socket 306 that offers TCP/IP transport 308, 310.

As a brief aside, TLS is a record based protocol; in other words, TLS uses data records which are arbitrarily sized (e.g., up to 16 kilobytes). In contrast, TCP is a byte stream protocol (i.e., a byte has a fixed length of eight (8) bits). Consequently, the TCP layer subdivides TLS records into a sequentially ordered set of bytes for delivery. The receiver of the TCP byte stream reconstructs TLS records from the TCP byte stream by receiving each TCP packet, re-ordering the packets according to sequential numbering to recreate the byte stream, and extracting the TLS record from the aggregated byte stream. Notably, every TCP packet of the sequence must be present before the TLS record can be reconstructed. Even though TCP can provide reliable delivery under lossy network conditions, there are a number of situations where TLS record delivery could fail. For example, under ideal conditions TCP isolates packet loss from its client (TLS in this example), and a single TCP packet loss should not result in failed TLS record delivery. However, the TLS layer or the application above may incorporate a timeout strategy in a manner that is unaware of the underlying TCP conditions. Thus, if there's significant packet loss in the network, the TLS timeout may be hit (and thus result in a failure to the application) even though TCP would normally provide reliable delivery.

Referring back to FIG. 3, virtually every modern operating system executes TLS from user space when e.g., securely connecting to other network entities, inter alia, a web browser instance and a server. But existing implementations of TLS are not executed from the kernel (or other privileged software layer) due to e.g., the complexity of error handling within the kernel. However, as a practical matter, TLS would operate significantly better with information regarding the current networking conditions (held in the kernel).

Ideally, the TLS layer should set TLS record sizes based on network condition information. In particular, large TLS records can efficiently use network bandwidth, but require many successful TCP packet deliveries. In contrast, small TLS records incur significantly more network overhead, but can survive poor bandwidth conditions. Unfortunately, networking condition information is lower layer information that is available to the kernel space (e.g., the DLIL and device drivers), but generally restricted from user space applications. Some $3^{rd}$ party application developers and device manufacturers have incorporated kernel extensions (or similar operating system capabilities) to provide network condition information to the TLS user space applications; however, kernel extensions are undesirable due to the aforementioned security and privacy concerns. Alternately, some $3^{rd}$ party applications infer the presence of lossy network conditions based on historic TLS record loss. Such inferences are an indirect measure and significantly less accurate and lag behind real-time information (i.e., previous packet loss often does not predict future packet loss).

Figure 4:
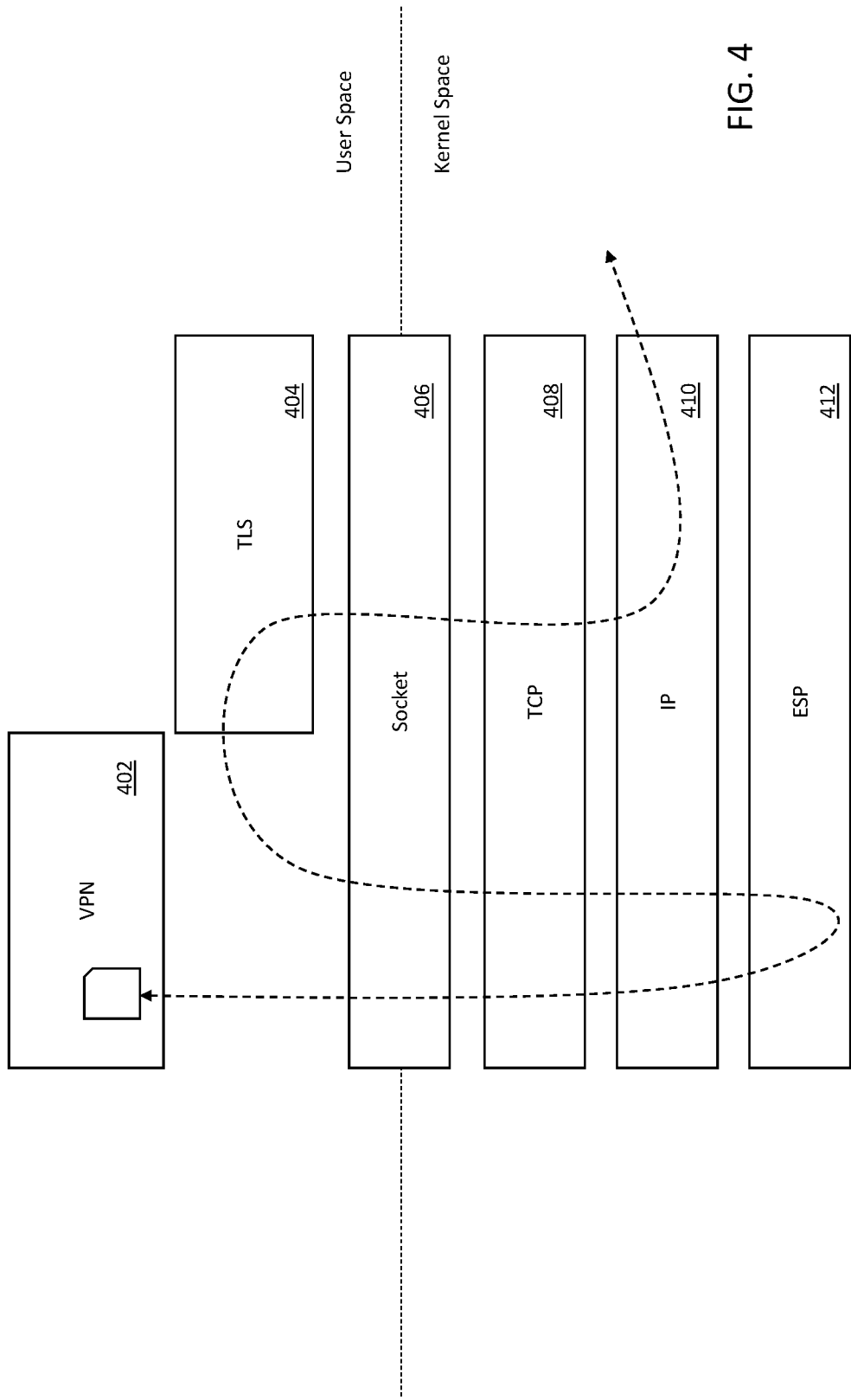
FIG. 4 is a logical block diagram of an exemplary implementation of a Virtual Private Network (VPN), useful for explaining various aspects of the present disclosure.

FIG. 4 illustrates a logical block diagram of an exemplary implementation of a Virtual Private Network (VPN), useful to explain recursive/cross-layer protocol layer complexities of emerging use cases.

As shown, an application executing from user space can open a Virtual Private Network (VPN) session 402 over a network socket 406 that offers TCP/IP transport 408, 410. The VPN session is secured with Encapsulating Security Protocol (ESP) 412. The encrypted packet is securely tunneled via TLS 404 (in user space) and recursively sent again over TCP/IP transport 408, 410.

As illustrated within FIG. 4, the exemplary VPN tunnel starts in user space, crosses into kernel space, returns back to user space, and then crosses back into kernel space before being transferred. Each of the domain crossings results in costly context switches and data shuffling both of which are processor intensive and inefficient. More directly, every time data traverses from user space to kernel space, the data must be validated (which takes non-trivial processing time). Additionally, context switching can introduce significant latency while the task is suspended.

Artisans of ordinary skill in the related arts, given the contents of the present disclosure, will readily appreciate that the exemplary recursive cross layer transaction of FIG. 4 is merely illustrative of a broad range of applications which use increasingly exotic protocol layer compositions. For example, applications that traverse the application proxy/agent data path commonly require tunneling TCP (kernel space) over application proxy/agent data path (user space) over UDP/IP (kernel space). Another common implementation is IP (kernel space) over Quick UDP Internet Connections (QUIC) (user space) over UDP/IP (kernel space).

Figure 5:
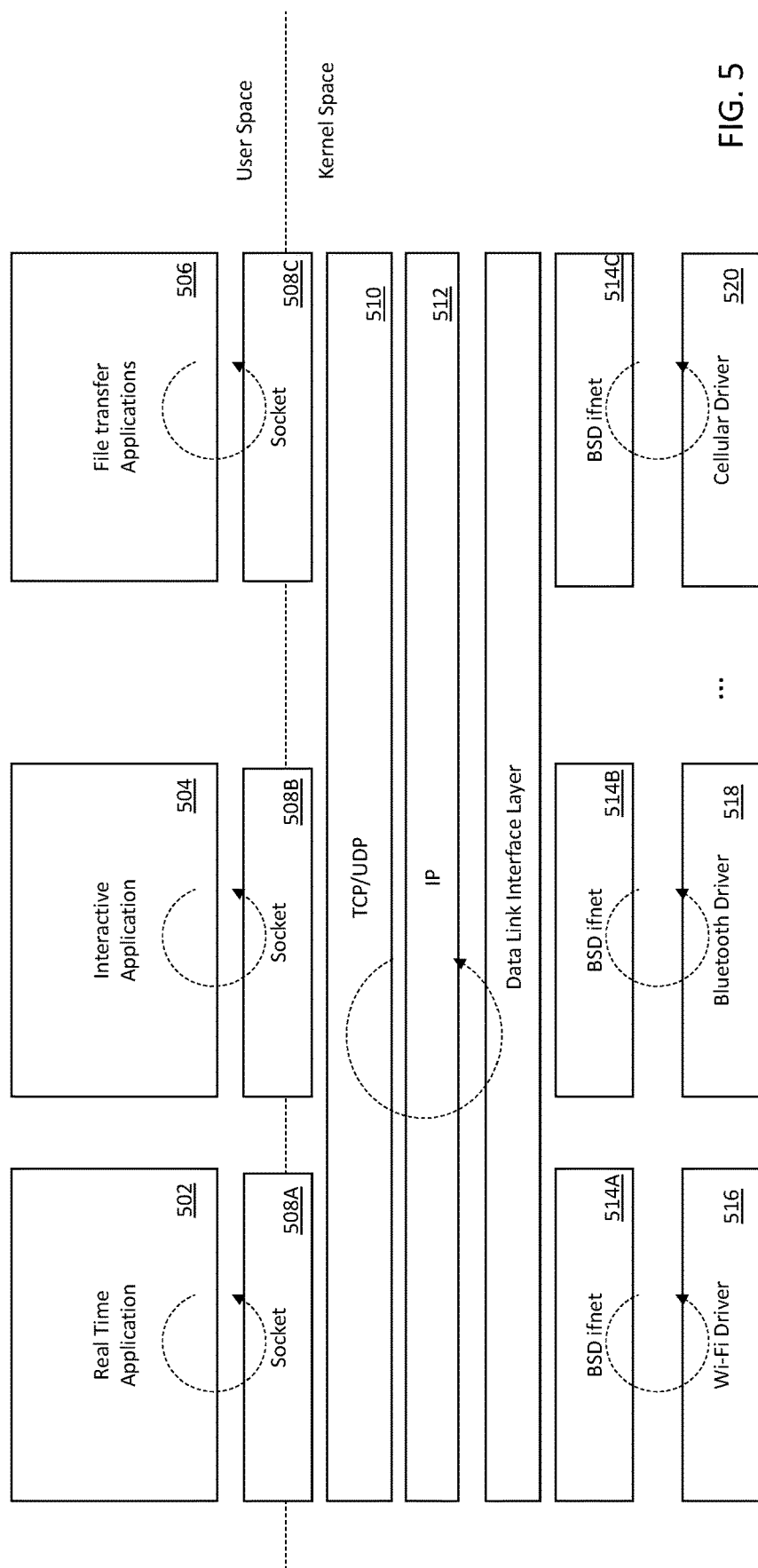
FIG. 5 is a logical block diagram of an exemplary implementation of application based tuning, useful for explaining various aspects of the present disclosure.

FIG. 5 illustrates a logical block diagram of an exemplary implementation of application based tuning, useful to explain various other workload optimization complexities of emerging use cases.

As shown, three (3) different concurrently executed applications (e.g., a real time application 502, interactive application 504, and file transfer applications 506) in user space, each open a session over network sockets 508 (508A, 508B, 508C) that offer TCP/UDP/IP transport 510/512. Depending on the type of physical interface required, the sessions are switched to BSD network interfaces (ifnet) 514 (514A, 514B, 514C) which handle the appropriate technology. Three different illustrated technology drivers are shown: Wi-Fi 516, Bluetooth 518, and cellular 520.

It is well understood within the networking arts that different application types are associated with different capabilities and requirements. One such example is real time applications 502, commonly used for e.g., streaming audio/visual and/or other "live" data. Real time data has significant latency and/or throughput restrictions; moreover, certain real time applications may not require (and/or support) retransmission for reliable delivery of lost or corrupted data. Instead, real time applications may lower bandwidth requirements to compensate for poor transmission quality (resulting in lower quality, but timely, delivered data).

Another such example is interactive applications 504, commonly used for e.g., human input/output. Interactive data should be delivered at latencies that are below the human perceptible threshold (within several milliseconds) to ensure that the human experience is relatively seamless. This latency interval may be long enough for a retransmission, depending on the underlying physical technology. Additionally, human perception can be more or less tolerant of certain types of data corruptions; for example, audio delays below 20 ms are generally imperceptible, whereas audio corruptions (pops and clicks) are noticeable. Consequently, some interactive applications may allow for some level of error correction and/or adopt less aggressive bandwidth management mechanisms depending on the acceptable performance requirements for human perception.

In contrast to real time applications and interactive applications, file transfer applications 506 require perfect data fidelity without latency restrictions. To these ends, most file transfer technologies support retransmission of lost or corrupted data, and retransmission can have relatively long attempt intervals (e.g., on the order of multiple seconds to a minute).

Similarly, within the communication arts, different communication technologies are associated with different capabilities and requirements. For example, Wi-Fi 516 (wireless local area networking based on IEEE 802.11) is heavily based on contention based access and is best suited for high bandwidth deliveries with reasonable latency. Wi-Fi is commonly used for file transfer type applications. Bluetooth 518 (personal area networking) is commonly used for low data rate and low latency applications. Bluetooth is commonly used for human interface devices (e.g., headphones, keyboards, and mouses). Cellular network technologies 520 often provide non-contention based access (e.g., dedicated user access) and can be used over varying geographic ranges. Cellular voice or video delivery is a good example of streaming data applications. Artisans of ordinary skill in the related arts will readily recognize that the foregoing examples are purely illustrative, and that different communication technologies are often used to support a variety of different types of application data. For example, Wi-Fi 516 can support file transfer, real time data transmission and/or interactive data with equivalent success.

Referring back to FIG. 5, the presence of multiple concurrently executing applications of FIG. 5 (real time application 502, interactive application 504, and file transfer applications 506) illustrates the complexities of multi-threaded operation. As shown therein, the exemplary multi-threaded operation incurs a number of server loops. Each server loop represents a logical break in the process during which the processor can context switch (see also aforementioned discussion of Existing Performance Optimization Technologies, and corresponding FIG. 2).

Moreover, in the computing arts, a "locking" synchronization mechanism is used by the kernel to enforce access limits (e.g., mutual exclusion) on resources in multi-threaded execution. During operation, each thread acquires a lock before accessing the corresponding locked resources data. In other words, at any point in time, the processor is necessarily limited to only the resources available to its currently executing process thread.

Unfortunately, each of the applications has different latency, throughput and processing utilization requirements. Since, each of the network interfaces is sending and receiving data at different times, in different amounts, and with different levels of priority. From a purely logistical standpoint, the kernel is constantly juggling between high priority kernel threads (to ensure that the high priority hardware activities do not stall out) while still servicing each of its concurrently running applications to attempt to provide acceptable levels of service. In some cases, however, the kernel is bottlenecked by the processor's capabilities. Under such situations, some threads will be deprioritized; currently, the traditional networking stack architecture is unable it clearly identify which threads can be deprioritized while still providing acceptable user service.

For example, consider an "expected use" device of FIG. 5; the processor is designed for the expected use case of providing streaming video. Designing for expected use cases allows the device manufacturer to use less capable, but adequate components thereby reducing bill of materials (BOM) costs and/or offering features at a reasonable price point for consumers. In this case, a processor is selected that nominally meets the requirements for a streaming video application that is receiving streaming video data via one of the network interfaces (e.g., the Wi-Fi interface), and constantly servicing the kernel threads associated with it. Rendering the video with a real time application 502 from the received data is a user space application that is executed concurrently but at a significantly lower priority. During expected usage, the video rendering is adequate.

Unfortunately, the addition of an unexpected amount of additional secondary interactive applications 504 (e.g., remote control interface, headphones, and/or other interface devices) and/or background file transfer applications can easily overwhelm the processor. Specifically, the primary real time application does not get enough CPU cycles to run within its time budget, because the kernel threads handling networking are selected at a higher priority. In other words, the user space application is not able to depress the priority of kernel networking threads (which are servicing both the primary and secondary processes). This can result in significantly worse user experience when the video rendering stalls out (video frame misses or video frame drops); whereas simply slowing down a file transfer or degrading the interaction interface may have been preferable.

Prior art solutions have tailored software for specific device implementations (e.g., the Apple TV®). For example, the device can be specifically programmed for an expected use. However, tailored solutions are becoming increasingly common and by extension the exceptions have swallowed the more generic use case. Moreover, tailored solutions are undesirable from multiple software maintenance standpoints. Devices have limited productive lifetimes, and software upkeep is non-trivial.

Ideally, a per-application or per-profile workload optimization would enable a single processor (or multiple processors) to intelligently determine when and/or how too intelligently context switch and/or prioritize its application load (e.g., in the example of FIG. 5, to prioritize video decode). Unfortunately, such solutions are not feasible within the context of the existing generic network sockets and generic network interfaces to a monolithic communications stack.

Exemplary Networking Architecture—

A networking stack architecture and technology that caters to the needs of non-kernel based networking use cases is disclosed herein. Unlike prior art monolithic networking stacks, the exemplary networking stack architecture described hereinafter includes various components that span multiple domains (both in-kernel, and non-kernel), with varying transport compositions, workload characteristics and parameters.

In one exemplary embodiment, a networking stack architecture is disclosed that provides an efficient infrastructure to transfer data across domains (user space, non-kernel, and kernel). Unlike the traditional networking paradigm that hide the underlying networking tasks within the kernel and substantially limits control thereof by any non-kernel applications, the various embodiments described herein enable faster and more efficient cross domain data transfers.

Various embodiments of the present disclosure provide a faster and more efficient packet input/output (I/O) infrastructure than prior art techniques. Specifically, unlike traditional networking stacks that use a "socket" based communication, disclosed embodiments can transfer data directly between the kernel and user space domains.

Direct transfer reduces the per-byte and per-packet costs relative to socket based communication. Additionally, direct transfer can improve observability and accountability with traffic monitoring.

In one such variant, a simplified data movement model that does not require mbufs (memory buffers) is described in greater detail herein. During one such exemplary operation, the non-kernel processes can efficiently transfer packets directly to and from the in-kernel drivers.

In another embodiment, a networking stack architecture is disclosed that exposes the networking protocol stack infrastructure to user space applications via network extensions. In one such embodiment, the network extensions are software agents that enable extensible, cross-platform-capable, user space control of the networking protocol stack functionality. In another such embodiment, an in-process user space networking stack facilitates tighter integration between the protocol layers (including TLS) and the application or daemon. In some cases, the user space architecture can expose low-level networking interfaces to transport protocols and/or encapsulation protocols such as UDP, TCP, and QUIC; and enable network protocol extensions and rapid development cycles. Moreover, artisans of ordinary skill in the related arts, given the contents of the present disclosure, will readily appreciate that the various principles described herein may be applied to a variety of other operating systems (such as Windows, Linux, Unix, Android), and/or other cross platform implementations.

In some variants, exemplary embodiments of the networking stack can support multiple system-wide networking protocol stack instances (including an in-kernel traditional network stack). Specifically, in one such variant, the exemplary networking stack architecture coexists with the traditional in-kernel networking stack so as to preserve backwards compatibility for legacy networking applications. In such implementations, the in-kernel network stack instance can coexist with the non-kernel network stack via namespace sharing and flow forwarding.

As used herein, an "instance" may refer to a single copy of a software program or other software object; "instancing" and "instantiations" refers to the creation of the instance. Multiple instances of a program can be created; e.g., copied into memory several times. Software object instances are instantiations of a class; for example, a first software agent and second software instance are each distinct instances of the software agent class.

In one such implementation, load balancing for multiple networking stacks is handled within the kernel, thereby ensuring that no single networking stack (including the in-kernel stack) monopolizes system resources.

As a related variant, current/legacy applications can be handled within the in-kernel stack. More directly, by supporting a separate independent in-kernel BSD stack, legacy applications can continue to work without regressions in functionality and performance.

Figure 6:
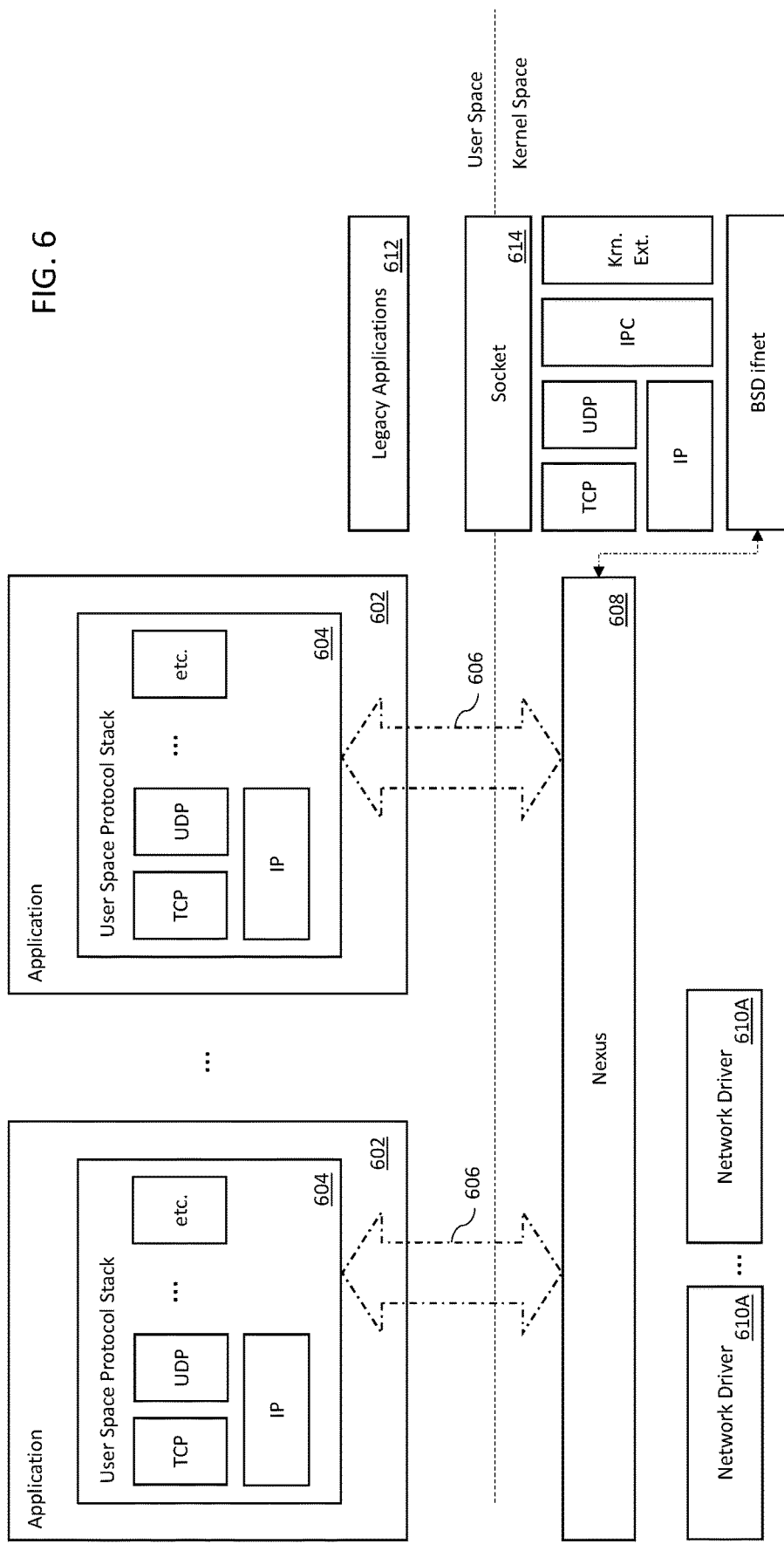
FIG. 6 is a logical representation of an exemplary networking stack architecture, in accordance with the various aspects of the present disclosure.

FIG. 6 illustrates one logical representation of an exemplary networking stack architecture, in accordance with the various aspects of the present disclosure. While the system depicts a plurality of user space applications 602 and/or legacy applications 612, artisans of ordinary skill will readily appreciate given the contents of present disclosure that the disclosed embodiments may be used within single application systems with equivalent success.

As shown, a user space application 602 can initiate a network connection by instancing user space protocol stacks 604. Each user space protocol stacks includes network extensions for e.g., TCP/UDP/QUIC/IP, cryptography, framing, multiplexing, tunneling, and/or any number of other networking stack functionalities. Each user space protocol stack 604 communicates with one or more nexuses 608 via a channel input/output (I/O) 606. Each nexus 608 manages access to the network drivers 610. Additionally shown is legacy application 612 support via existing network socket technologies 614. While the illustrated embodiment shows nexus connections to both user space and in-kernel networking stacks, it is appreciated that the nexus may also enable e.g., non-kernel networking stacks (such as may be used by a daemon or other non-kernel, non-user process).

The following topical sections hereinafter describe the salient features of the various logical constructs in greater detail.

Exemplary I/O Infrastructure

In one exemplary embodiment, the non-kernel networking stack provides a direct channel input output (I/O) 606. In one such implementation, the channel I/O 606 is included as part of the user space protocol stack 604. More directly, the channel I/O 606 enables the delivery of packets as a raw data I/O into kernel space with a single validation (e.g., only when the user stack provides the data to the one or more nexuses 608). The data can be directly accessed and/or manipulated in situ, the data need not be copied to an intermediary buffer.

In one exemplary implementation, a channel is an I/O scheme leveraging kernel-managed shared memory. During an access, the channel I/O is presented to the process (e.g., the user process or kernel process) as a file descriptor based object, rather than as data. In order to access the data, the process de-references the file descriptor for direct access to the shared memory within kernel space. In one such implementation, the file descriptor based object based I/O is compatible with existing operating system signaling and "eventing" (event notification/response) mechanisms. In one exemplary variant, the channel I/O is based on Inter Process Communication (IPC) packets.

As used herein, the term "descriptor" may refer to data structures that indicate how other data is stored. Descriptors generally include multiple parameters and can be used to identify more complex data structures; for example, a descriptor may include one or more of type, size, address, tag, flag, headers, footers, metadata, structural links to other data descriptors or locations, and/or any other number of format or construction information.

Within the context of the present disclosure, as used herein, the term "pointer" may refer to a specific reference data type that "points" or "references" a location of data in memory. Typically, a pointer stores a memory address that is interpreted by a compiler as an absolute location in system memory or a relative location in system memory based on e.g., a base address, reference address, memory window, or other memory subset. During operation, a pointer is "de-referenced" to recover the data that is stored in the location of memory.

As used herein, the term "metadata" refers to data that describes data. Metadata varies widely in application, but generally falls into one of the descriptive, structural, and/or administrative categories. Descriptive metadata describes data in a manner to enable e.g., discovery and/or identification. Common examples include without limitation e.g., type, size, index tags, and keywords. Structural metadata describes the structure of the data e.g., how compound objects are put together. Common examples include without limitation e.g., prefix, postfix, table of contents, order, and/or any other information that describes the relationships and other characteristics of digital materials. Administrative metadata provides information to help manage a resource; common examples include e.g., authorship and creation information, access privileges, and/or error checking and security based information (e.g., cyclic redundancy checks (CRC), parity, etc.).

In one exemplary embodiment, the channel I/O can be further leveraged to provide direct monitoring of its corresponding associated memory. More directly, unlike existing data transfers which are based on mbuf based divide/copy/move, etc., the channel I/O can provide (with appropriate viewing privileges) a direct window into the memory accesses of the system. Such implementations further simplify software development as debugging and/or traffic monitoring can be performed directly on traffic. Direct traffic monitoring can reduce errors attributed to false positives/false negatives caused by e.g., different software versioning, task scheduling, compiler settings, and/or other software introduced inaccuracies.

More generally, unlike prior art solutions which relied on specialized networking stack compositions to provide different degrees of visibility at different layers, the monitoring schemes of the present disclosure provide consistent system-wide channel monitoring infrastructures. Consistent frameworks for visibility, accounting, and debugging greatly improve software maintenance and upkeep costs.

Additionally, simplified schemes for egress filtering can be used to prevent traffic spoofing for user space networking stack instances. For example, various embodiments ensure that traffic of an application cannot be hijacked by another malicious application (by the latter claiming to use the same tuple information, e.g. TCP/UDP port).

In one exemplary embodiment, the in-kernel network device drivers (e.g. Wi-Fi, Cellular, Ethernet) use simplified data movement models based on the aforementioned channel I/O scheme. More directly, the user space networking stacks can directly interface to each of the various different technology based network drivers via channel I/O; in this manner, the user space networking stacks do not incur the traditional data mbuf based divide/copy/move penalties. Additionally, user space applications can directly access user space networking components for immediate traffic handling and processing.

Exemplary Nexus

In one exemplary embodiment, the networking stack connects to one or more nexus 608. In one such implementation, the nexus 608 is a kernel space process that arbitrates access to system resources including, without limitation e.g., shared memory within kernel space, network drivers, and/or other kernel or user processes. In one such variant, the nexus 608 aggregates one or more channels 606 together for access to the network drivers 610 and/or shared kernel space memory.

In one exemplary implementation, a nexus is a kernel process that determines the format and/or parameters of the data flowing through its connected channels. In some variants, the nexus may further perform ingress and/or egress filtering.

The nexus may use the determined format and/or parameter information to facilitate one-to-one and one-to-many topologies. For example, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

Additionally, in some variants the nexus may provide the format, parameter, and/or ingress egress information to kernel processes and/or one or more appropriately privileged user space processes.

In one exemplary embodiment, the *nexus* 608 may additionally ensure that there is fairness and/or appropriately prioritize each of its connected stacks. For example, within the context of FIG. 6, the *nexus* 608 balances the network priorities of both the existing user space protocol stacks 604, as well as providing fair access for legacy socket based access 614. For example, as previously alluded to, existing networking stacks could starve user space applications because the kernel threads handling the legacy networking stack operated at higher priorities than user space applications. However, the exemplary *nexus* 608 ensures that legacy applications do not monopolize system resources by appropriately servicing the user space network stacks as well as the legacy network stack.

In one such embodiment, in-kernel, non-kernel, and/or user space infrastructures ensure fairness and can reduce latency due to e.g., buffer bloat (across channels in a given nexus, as well as flows within a channel). In other words, the in-kernel and/or user space infrastructures can negotiate proper buffering sizes based on the expected amount of traffic and/or network capabilities for each flow. By buffering data according to traffic and/or network capability, buffers are not undersized or oversized.

As a brief aside, "buffer bloat" is commonly used to describe e.g., high latency caused by excessive buffering of packets. Specifically, buffer bloat may occur when excessively large buffers are used to support a real time streaming application. As a brief aside, TCP retransmission mechanism relies on measuring the occurrence of packet drops to determine the available bandwidth. Under certain congestion conditions, excessively large buffers can prevent the TCP feedback mechanism from correctly inferring the presence of a network congestion event in a timely manner (the buffered packets "hide" the congestion, since they are not dropped). Consequently, the buffers have to drain before TCP congestion control resets and the TCP connection can correct itself.

Referring back to FIG. 6, in one exemplary embodiment, Active Queue Management (AQM) can be implemented in the kernel across one or more (potentially all) of the flow-switch clients (user space and in-kernel networking stack instances). AQM refers to the intelligent culling of network packets associated with a network interface, to reduce network congestion. By dropping packets before the queue is full, the AQM ensures no single buffer approaches its maximum size, and TCP feedback mechanisms remain timely (thereby avoiding the aforementioned buffer bloat issues).

While the foregoing example is based on "fairness" standard, artisans of ordinary skill in the related arts will readily appreciate that other schemes may be substituted with equivalent success given the contents of the present disclosure. For example, some embodiments may dynamically or statically service the user application networking space with greater or less weight compared to the legacy socket based access. For example, user application networking space may be more heavily weighted to improve overall performance or functionality, whereas legacy socket based access may be preferred where legacy applications are preferentially supported (e.g., see Protocol Unloading Offloading, discussed infra).

Exemplary Network Extensions

In one exemplary embodiment of the present disclosure, a network extension is disclosed. A network extension is an agent-based extension that is tightly coupled to network control policies. The agent is executed by the kernel and exposes libraries of network control functionality to user space applications. During operation, user space software can access kernel space functionality through the context and privileges of the agent.

As used herein, the term "agent" may refer to a software agent that acts for a user space application or other program in a relationship of agency with appropriate privileges. The agency relationship between the agent and the user space application implies the authority to decide which, if any, action is appropriate given the user application and kernel privileges. A software agent is privileged to negotiate with the kernel and other software agents regarding without limitation e.g., scheduling, priority, collaboration, visibility, and/other sharing of user space and kernel space information. While the agent negotiates with the kernel on behalf of the application, the kernel ultimately decides on scheduling, priority, etc.

Various benefits and efficiencies can be gained through the use of network extensions. In particular, user space applications can control the protocol stack down to the resolution of exposed threads (i.e., the threads that are made available by the agent).

In other words, software agents expose specific access to lower layer network functionality which was previously hidden or abstracted away from user space applications. For example, consider the previous examples of TLS record sizing (see e.g., FIG. 3, and related discussion); by exposing TCP network conditions to the TLS application within the user space, the TLS application can correctly size records for network congestion and/or wait for underlying TCP retransmissions (rather than timing out).

Similarly, consider the previous examples of multi-threading within the context of expected use devices (see e.g., FIG. 5, and related discussion); the primary user space application (e.g., video coding) and additional secondary interactive applications (e.g., remote control interface, headphones, and/or other interface devices) can internally negotiate their relative priority to the user's experience. The user space applications can appropriately adjust their priorities for the nexus (i.e., which networking threads are serviced first and/or should be deprioritized). Consequently, the user space applications can deprioritize non-essential network accesses, thereby preserving enough CPU cycles for video decode.

As a related benefit, since a software agent represents the application to the kernel; the agent can trust the kernel, but the kernel may or may not trust the agent. For example, a software agent can be used by the kernel to convey network congestion information in a trusted manner to the application; similarly, a software agent can be used by an application to request a higher network priority. Notably, since a software agent operates from user space, the agent's privilege is not promoted to kernel level permissions. In other words, the agent does not permit the user application to exceed its privileges (e.g., the agent cannot commandeer the network driver at the highest network priority, or force a read/write to another application's memory space without the other kernel and/or other application's consent).

Networking extensions allow the user space application to execute networking communications functionality within the user space and interpose a network extension between the user space application and the kernel space. As a result, the number of cross domain accesses for complex layering of different protocol stacks can be greatly reduced. Limiting cross domain accesses prevents context switching and allows the user space to efficiently police its own priorities. For example, consider the previous example of a VPN session as was previously illustrated in FIG. 4. By keeping the TCP/IP, Internet Protocol Security (IPsec) and TLS operations within user space, the entire tunnel can be performed within the user space, and only cross the user/kernel domain once.

As used herein, the term "interposition" may refer to the insertion of an entity between two or more layers. For example, an agent is interposed between the application and the user space networking stack. Depending on the type of agent or network extension, the interposition can be explicit or implicit. Explicit interposition occurs where the application explicitly instances the agent or network extension. For example, the application may explicitly call a user space tunnel extension. In contrast, implicit interposition occurs where the application did not explicitly instance the agent or network extension. Common examples of implicit interposition occur where one user space application sniffs the traffic or filters the content of another user space application.

Namespace Sharing & Flow Forwarding Optimizations

In one exemplary optimization of the present disclosure, the nexus includes a namespace registration and management component that manages a common namespace for all of its connected networking stack instances. As a brief aside, a namespace generally refers to a set of unique identifiers (e.g., the names of types, functions, variables) within a common context. Namespaces are used to prevent naming "collisions" which occur where multiple processes call the same resource differently and/or call different resources the same.

In one such implementation, the shared networking protocol has a common namespace (e.g., {Address, Protocol, and Port}) across multiple networking stack instances. Sharing a namespace between different networking stacks reduces the amount of kernel burden, as the kernel can natively translate (rather than additionally adding a layer of network address translation).

For example, if a first application acquires port 80, the namespace registration ensures that other applications will not use port 80 (e.g., they can be assigned e.g., port 81, 82, etc.) In some such implementations, legacy clients may use default namespaces that conflict (e.g., a default web client may always select port 80); thus the shared namespace registration may also be required to force a re-assignment of a new identifier (or else translate for) such legacy applications.

In one exemplary embodiment, the namespace registration and management components control flow-switching and forwarding logic of each flow-switch nexus instance. For example, as previously noted, the nexus can create user-pipes for process-to-process channels; kernel-pipes for process-to-kernel channels; network interfaces for direct channel connection from a process to in-kernel network drivers, or legacy networking stack interfaces; and/or flow-switches for multiplexing flows across channels (e.g., switching a flow from one channel to one or more other channels).

For example, during normal operation when an application requests a port, the namespace registration and management will create a flow and assign a particular port to the application. Subsequent packets addressed to the port will be routed appropriately to the flow's corresponding application. In one such variant, packets that do not match any registered port within the shared namespace registration and management will default to the legacy networking stack (e.g., the flow-switch assumes that the unrecognized packet can be parsed and/or ignored by the fallback legacy stack).

Artisans of ordinary skill in the related arts will readily appreciate, given the contents of the present disclosure that disparate and/or otherwise distinct namespace registrations and/or management components may be preferable based on other implementation specific considerations. For example, some implementations may prefer to shield namespaces from other external processes e.g., for security and/or privacy considerations. In other implementations, the benefits associated with native namespace translation may be less important than supporting legacy namespaces.

Protocol Onloading and Offloading

In the foregoing discussions, the improvements to user space operation may be primarily due to the user space networking stack, as shown in FIG. 6. However, various embodiments of the present disclosure also leverage the existing legacy host networking infrastructure to handle networking transactions which are unrelated to user experience.

Colloquially, the term "hardware offload" may be commonly used to denote tasks which can be handled within dedicated hardware logic to improve overall processing speed or efficiency. One such example is the cyclic redundancy check (CRC) calculation which is an easily parameterized, closed, iterative calculation. The characteristics of CRC calculation lend itself to hardware offload because the CRC does not benefit from the flexibility of a general purpose processor, and CRC calculations are specialized functions that are not transferable to other processing operations.

By analogous extension, as used herein, the term "protocol offload" may refer to processes that should be handled within the legacy networking stack because they are not specific to a user space application or task. In contrast, the term "protocol onload" may refer to processes that should be handled within a user space networking stack because they are specific to a user space application or task and benefit the overall performance. As a general qualitative criteria, tasks which are "fast" (e.g., generally UDP/TCP/IP based user space applications) are protocol onloaded to improve user performance; in contrast "slow" tasks (e.g., ARP, IPv6 Neighbor Discovery, Routing table updates, control path for managing interfaces, etc.) are protocol offloaded.

For example, consider Address Resolution Protocol (ARP) request handling; when an ARP request comes in, the host processor responds with a reply. However, the ARP request is non-specific to a user space application; rather the ARP reply concerns the holistic system. More generally, any networking process that is not specific to an application space can be implemented within the kernel under legacy techniques. Alternatively, any process that can be handled regardless of device state should remain with the kernel (e.g., the kernel persists across low power states, and is never killed).

By allowing the mature in-kernel networking stack to retain ownership of certain control logic (e.g. routing and policy table, interface configuration, address management), various embodiments of the present disclosure avoid "split-brain" behaviors. In other words, the kernel ensures that networking data and/or availability remains consistent regardless of the user space application availability.

Exemplary User Space Networking Stack

Figure 7:
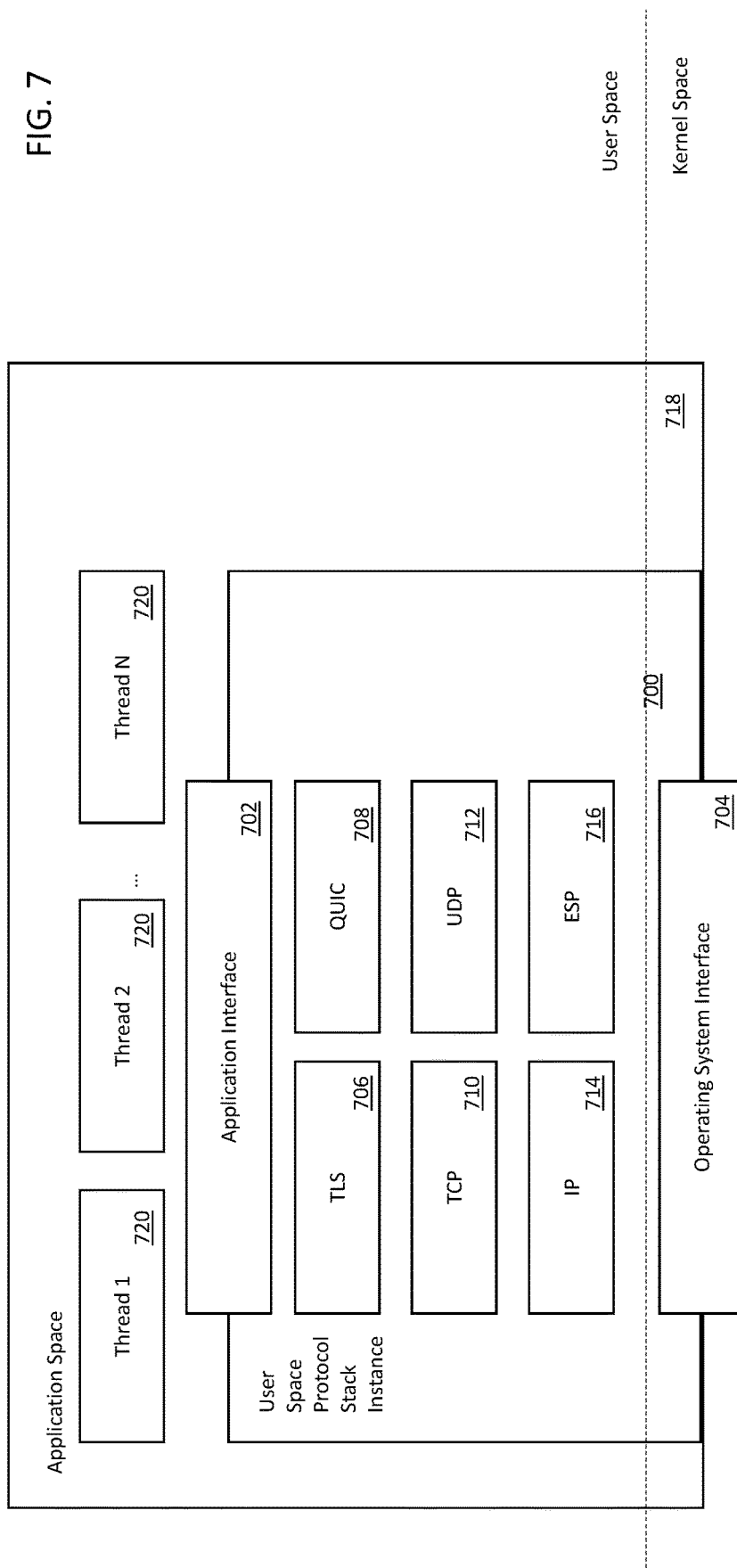
FIG. 7 is a logical block diagram of an exemplary user space networking stack, in accordance with the various aspects of the present disclosure.

Referring now to FIG. 7, one logical block diagram of an exemplary user space networking stack 700 is depicted. As shown, the user space networking stack 700 includes an application interface 702, and an operating system interface 704.

Additionally, the user space networking stack includes one or more user space instances of TLS 706, QUIC 708, TCP 710, UDP 712, IP 714, and ESP 716. The disclosed instances are purely illustrative, artisans of ordinary skill in the related arts will readily appreciate that any other user space kernel extension and/or socket functionality may be made available within the user space networking stack 700.

In one exemplary embodiment, the user space networking stack 700 is instantiated within an application user space 718. More directly, the user space networking stack 700 is treated identically to any one of multiple threads 710 within the application user space 718. Each of the coexisting threads 720 has access to the various functions and libraries offered by the user space networking stack via a direct function call.

As a brief aside, each of the threads 720 reside within the same address space. By virtue of their shared addressability, each of the threads may grant or deny access to their portions of shared address space via existing user space memory management schemes and/or virtual machine type protections. Additionally, threads can freely transfer data structures from one to the other, without e.g., incurring cross domain penalties. For example, TCP data 710 can be freely passed to TLS 706 as a data structure within a user space function call.

As previously noted, the user space networking stack 700 may grant or deny access to other coexistent user space threads; e.g., a user space thread is restricted to the specific function calls and privileges made available via the application interface 702. Furthermore, the user space networking stack 700 is further restricted to interfacing the operating system via the specific kernel function calls and privileges made available via the operating system interface 704. In this manner, both the threads and the user space networking stack have access and visibility into the kernel space, without compromising the kernel's security and stability.

One significant benefit of the user space networking stack 700 is that networking function calls can be made without acquiring various locks that are present in the in-kernel networking stack. As previously noted, the "locking" mechanism is used by the kernel to enforce access limits on multiple threads from multiple different user space applications; however in the user space, access to shared resources are handled within the context of only one user application space at a time, consequently access to shared resources are inherently handled by the single threading nature of user space execution. More directly, only one thread can access the user space networking stack 700 at a time; consequently, kernel locking is entirely obviated by the user space networking stack. Another benefit of user space based network stack operation is cross platform compatibility. For example, certain types of applications (e.g., iTunes®, Apple Music® developed by the Assignee hereof) are deployed over a variety of different operating systems. Similarly, some emerging transport protocols (e.g. QUIC) are ideally served by portable and common software between the client and server endpoints. Consistency in the user space software implementation allows for better and more consistent user experience, improves statistical data gathering and analysis, and provides a foundation for enhancing, experimenting and developing network technologies used across such services. In other words, a consistent user space networking stack can be deployed over any operating system platform without regard for the native operating system stack (e.g., which may vary widely).

Another important advantage of the exemplary user space networking stack is the flexibility to extend and improve the core protocol functionalities, and thus deliver specialized stacks based on the application's requirements. For example, a video conferencing application (e.g., FaceTime® developed by the Assignee hereof) may benefit from a networking stack catered to optimize performance for real-time voice and video-streaming traffics (e.g., by allocating more CPU cycles for video rendering, or conversely deprioritizing unimportant ancillary tasks). In one such variant, a specialized stack can be deployed entirely within the user space application, without specialized kernel extensions or changes to the kernel. In this manner, the specialized user space networking stack can be isolated from networking stacks. This is important both from a reliability standpoint (e.g., updated software doesn't affect other software), as well as to minimize debugging and reduce development and test cycle times.

Furthermore, having the network transport layer (e.g. TCP, QUIC) reside in user space can open up many possibilities for improving performance. For example, as previously alluded to, applications (such as TLS) can be modified depending on the underlying network connections. User space applications can be collapsed or tightly integrated into network transports. In some variants, data structure sizes can be adjusted based on immediate lower layer network condition information (e.g., to accommodate or compensate for poor network conditions). Similarly, overly conservative or under conservative transport mechanisms can be avoided (e.g., too much or not enough buffering previously present at the socket layer). Furthermore, unnecessary data copies and/or transforms can be eliminated and protocol signaling (congestion, error, etc.) can be delivered more efficiently.

In yet another embodiment, the exemplary user space networking stack further provides a framework for both networking clients and networking providers. In one such variant, the networking client framework allows the client to interoperate with any network provider (including the legacy BSD stack). In one such variant, the network provider framework provides consistent methods of discovery, connection, and data transfer to networking clients. By providing consistent frameworks for clients and providers which operate seamlessly over a range of different technologies (such as a VPN, Bluetooth, Wi-Fi, cellular, etc.), the client software can be greatly simplified while retaining compatibility with many different technologies.

Exemplary Proxy Agent Application Operation

Figure 8:
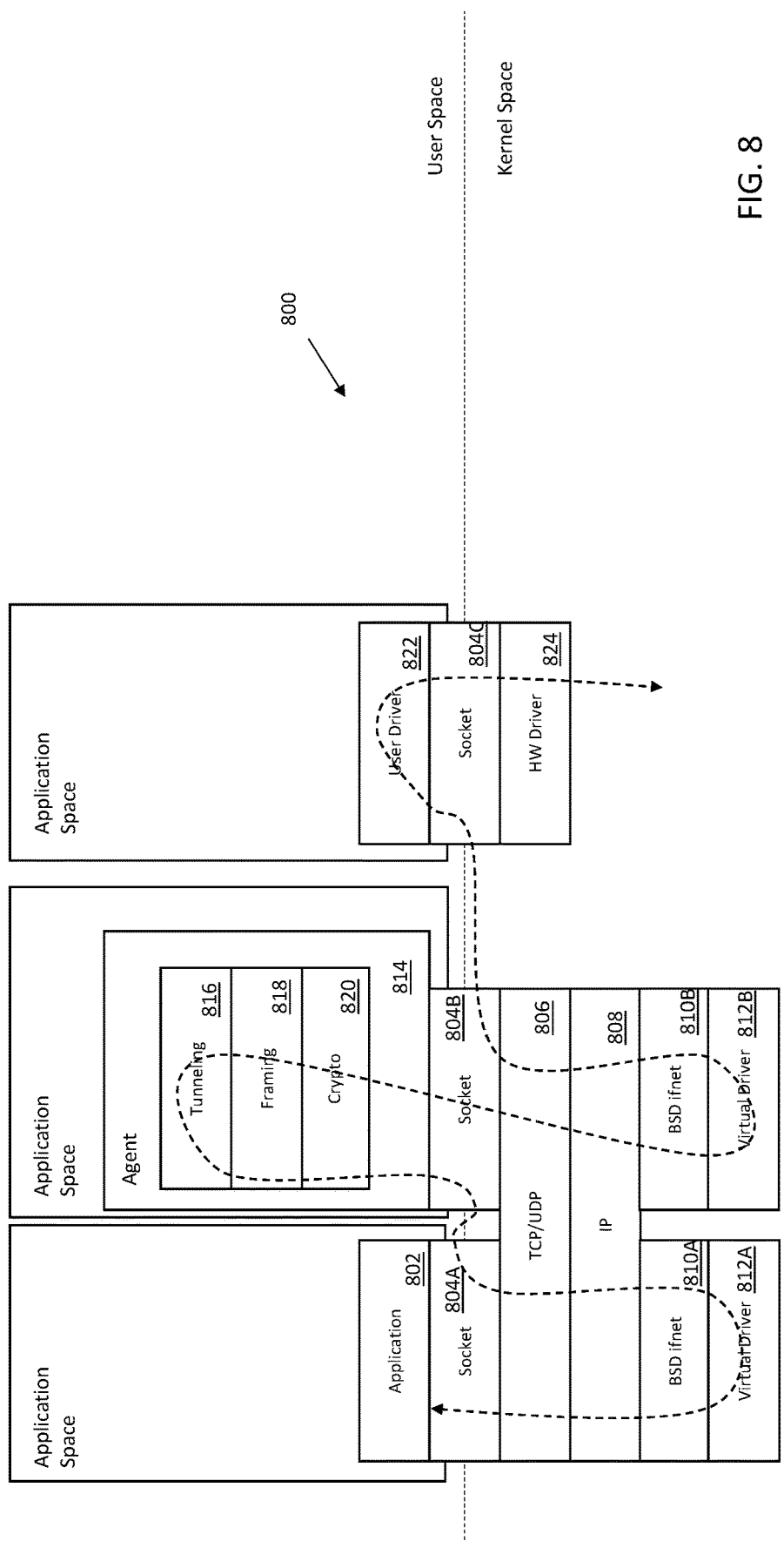
FIG. 8 is a logical flow diagram useful to summarize the convoluted data path taken for a prior art application using a proxy agent application within the context of the traditional networking stack, useful for explaining various aspects of the present disclosure.

FIG. 8 depicts one logical flow diagram useful to summarize the convoluted data path taken for a prior art application using a proxy agent application within the context of the traditional networking stack. As shown therein, an application 802 transmits data via a socket 804A to route data packets to a proxy agent application 814 via a TCP/IP 806/808 and a BSD network interface 810A. The data packets enter kernel space; this is a first domain crossing which incurs validation and context switching penalties.

Inside the kernel, the data is divided/copied/moved for delivery via the TCP/IP stack 806/808 to the BSD network interface 810A. The BSD network interface 810A routes the data to a virtual driver 812A. These steps may introduce buffering delays as well as improper buffer sizing issues such as buffer bloat.

In order to access the application proxy (which is in a different user space), the virtual driver reroutes the data to a second socket 804B which is in the different user space from the original application. This constitutes a second domain crossing, which incurs additional validation and context switching penalties.

In user space, the data enters an agent 814 which prepares the data for delivery (tunneling 816, framing 818, and cryptographic security 820). Thereafter, the proxy agent 814 transmits the prepared data via a socket 804B to route data packets to a user space driver 822 via the TCP/IP 806/808 and a separate BSD network interface 810B. Again, the data is passed through the socket 804B. This is a third domain crossing, with validation and context switching penalties.

Inside the kernel, the data is divided/copied/moved for delivery via the TCP/IP stack 806/808 to a BSD network interface 810B. The steps of The BSD network interface 810B routes the data to a virtual driver 812B. These steps introduce additional buffering delays as well as improper buffer sizing issues such as buffer bloat.

Finally, the virtual driver 812B reroutes the data to the user space driver (e.g., a Universal Serial Bus (USB) driver), which requires another socket transfer from 804B to 804C; the data crosses into the user space for the user based driver 822, and crosses the domain a fifth time to be routed out the USB Hardware (H/W) driver 824. Each of these domain crossings are subject to the validation and context switching penalties as well as any buffering issues.

Figure 9:
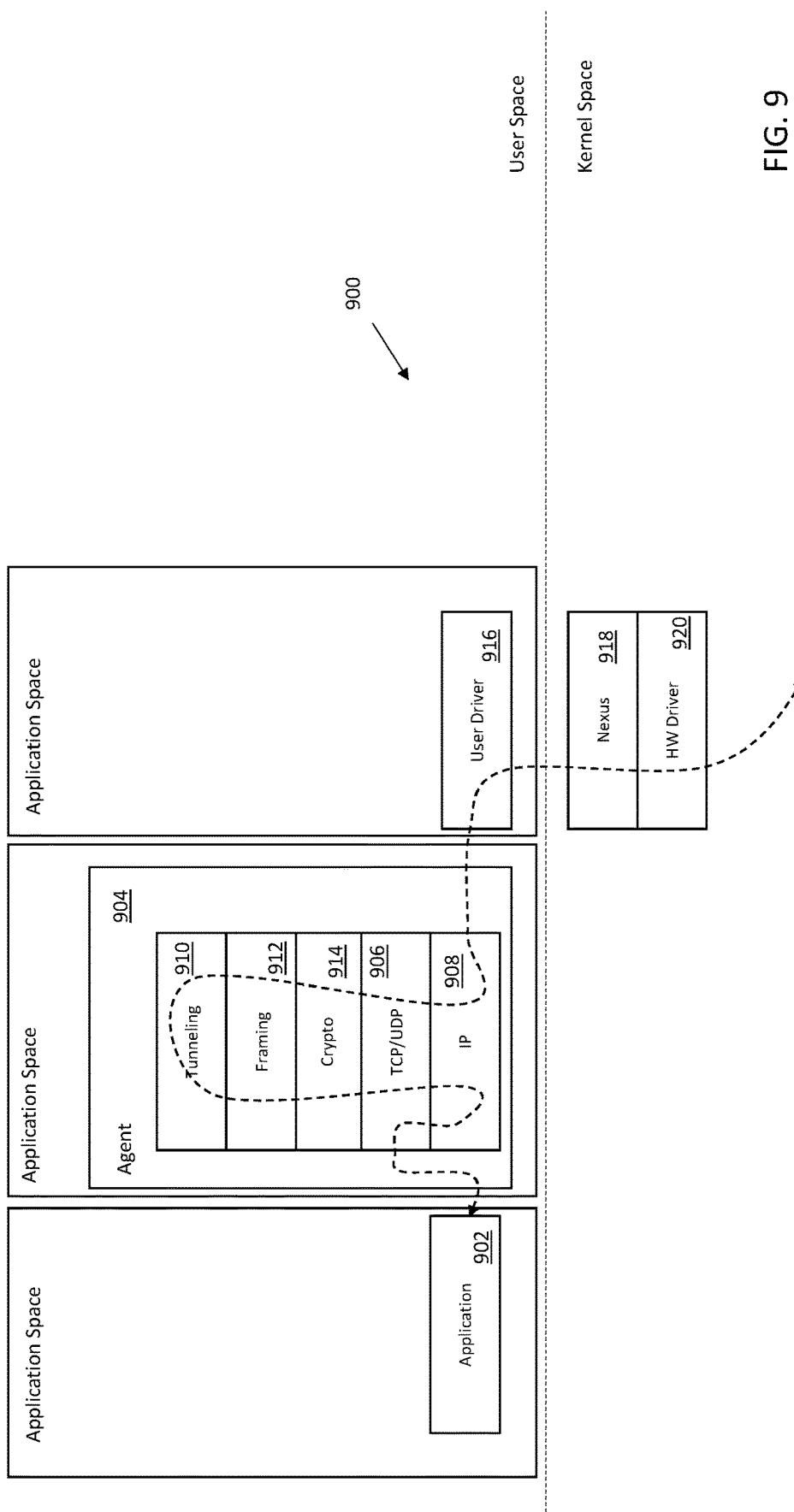
FIG. 9 is a logical flow diagram useful to summarize an exemplary proxy agent application within the context of the user space networking stack, in accordance with various aspects of the present disclosure.

FIG. 9 depicts one logical flow diagram useful to summarize an exemplary proxy agent application within the context of the user space networking stack, in accordance with the various aspects of the present disclosure.

As shown therein, an application 902 provides data via shared memory space file descriptor objects to the agent 904. The agent 904 internally processes the data via TCP/IP 906/908 to the tunneling function 910. Thereafter, the data is framed 912, cryptographically secured 914, and routed via TCP/IP 906/908 to the user driver 916. The user driver uses a channel I/O to communicate with nexus 918 for the one (and only) domain crossing into kernel space. Thereafter, the nexus 918 provides the data to the H/W driver 920.

When compared side-by-side, the user space networking stack 900 has only one (1) domain crossing, compared to the traditional networking stack 800 which crossed domains five (5) times for the identical VPN operation. Moreover, each of the user space applications could directly pass data via function calls within user memory space between each of the intermediary applications, rather than relying on the kernel based generic mbuf divide/copy/move scheme (and its associated buffering inefficiencies).

Self-Tuning Enhancements—

Self-tuning enhancements for devices with dynamic processing capabilities are disclosed herein. In one exemplary embodiment, a processor includes multiple cores (or components) that have different characteristics. The characteristics of each core can be leveraged to improve performance and/or efficiency. In particular, various ones of the processing cores may be manufactured to optimize e.g., performance, power consumption, etc.

As used herein, the term "processing apparatus" or "processor" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components. The term "processing apparatus" or "processor" further refers to any logic or circuitry that responds to and processes computer-readable instructions that are stored within, for example, a non-transitory computer-readable medium, e.g., a memory.

As used herein, a "core" of a processor may refer to an independent processing unit within the processor, which reads and executes program instructions. The instructions are ordinary CPU instructions (e.g., add, move data, and branch), but a single processor can run multiple instructions on one or more separate cores at the same time. Utilization of multiple cores within the single processor can increase overall speed for programs amenable to parallel computing. Manufacturers typically integrate the cores onto a single integrated circuit die or onto multiple dies in a single chip package. The microprocessors currently used in almost all personal computers are multi-core.

Figure 10:
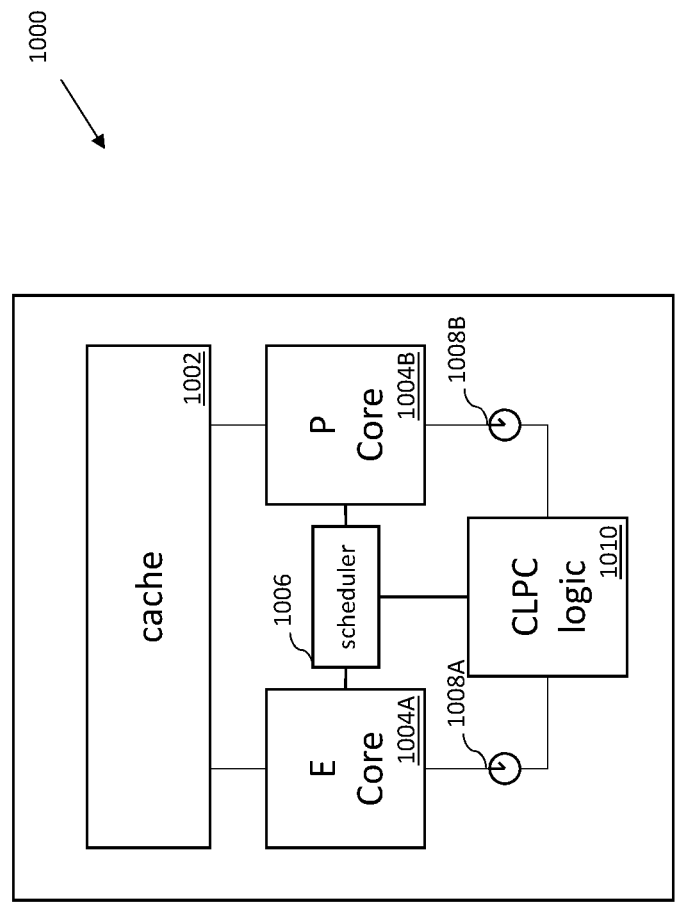
FIG. 10 is a logical representation of an exemplary processor apparatus, in accordance with various aspects of the present disclosure.

FIG. 10 is a logical block diagram of one exemplary processor 1000, which includes two exemplary cores 1004. The two cores ("E Core" 1004A and "P Core" 1004B) are in data communication with one or more cache memories 1002, a scheduler 1006, clocks 1008, and a closed loop performance controller (CLPC) logic 1010. Artisans of ordinary skill in the related arts will readily appreciate the myriad of combinations and permutations of the components that may be implemented separately or together as individual logics combining one or more of the other components.

In the illustrated embodiment, the energy efficient (E) Core 1004A may be optimized for low power consumption and operation at low clock frequencies, and the performance (P) Core 1004B may be optimized for performance and operation at high clock frequencies. In the illustrated embodiment, a common cache is shown for clarity; however many implementations provide different cores with access to different resources (e.g., number, types, and sizes of memory caches) and/or other physical/manufacturing differences. Artisans of ordinary skill in the related arts will readily appreciate that the two core system described herein is simplified for clarity; existing systems may use many more cores. For example, more sophisticated systems may include e.g., two high-performance cores and four power efficient cores, with all six cores available for use at the same time. Moreover, future implementations may provide multi-layer gradations of power consumption and/or performance.

The scheduler 1006 may be in data communication with existing cores to schedule the instructions to be processed by each core. The CLPC logic 1010 may be in data communication with the scheduler 1006 to determine the appropriate clock frequencies (e.g., to be generated by the clocks 1008). For example, each core may have a dynamic frequency control capability based on the foregoing architecture, and the processor threads may be balanced on the cores and clock frequency to achieve e.g., 100% (or as close thereto) utilization of processing cycles for the scheduled instructions, with the lowest power consumption cost. As discussed previously herein, artisans of ordinary skill in the related arts will readily appreciate that the scheduler 1006 and the CLPC logic 1010 may be implemented separately or together as one entity (that serves both functionalities).

Prior art packet processing in kernel space monolithic stacks only exposed data via sockets to the user space application; context switching between the user space and kernel space was only performed after packet processing. In contrast, the exemplary networking stack architecture described herein route packets via e.g., a flow-switch in kernel space, to the user space communication stack (crossing the user-kernel boundary via channel data structures). Frequently switching between contexts for transacting packets and packet processing would detract from performance. Thus, packets may be stored in batches (grouped) for subsequent user space processing. Notably, however, batch size directly affects performance; waiting to fill very large batches might result in too much latency, whereas processing small batches might suffer from performance loss due to excessive domain-crossing.

Further complicating matters, network congestion management often does not account for different rates of packet processing attributed to different dynamic processor modes. In particular, network congestion management always assumes that packet processing is slowed down due to network congestion. For example, consider a scenario where a dynamic processor 1000 switches from the P Core 1004B to the E Core 1004A in order to reduce power consumption. The E Core 1004A is slower than the P Core 1004B and some packets may be delayed relative to P Core 1004B operation. To an external network entity (e.g., a network server), the sudden slowdown is assumed to be a network congestion problem. In other words, the network server does not account for the difference in processing speed between the E Core 1004A and the P Core 1004B. Responsively, the network server reduces the device bandwidth (the number of packets transacted) so as to allow the "phantom network congestion" to dissipate.

Unfortunately, the aforementioned closed loop performance controller (CLPC) logic 1010 operates on different assumptions and infers that the reduced packet load from the network server means there is less work to do. Responsively, the CPLC logic 1010 will continue to reduce the E Core's 1004A processor clock to achieve 100% utilization.

In other words, the CLPC logic always assumes that reduced processing loads should allow for slower processing clocks (and better power consumption). In other words, the combination of network congestion logic and CLPC logic result in an undesirable feedback loop to slow down packet processing resulting in unnecessary performance loss. Artisans of ordinary skill in the related arts will readily appreciate that the foregoing example is circular. It does not matter if CLPC logic slows down the processor first, or if the network congestion causes a slower than expected packet delivery. Once triggered, the feedback loop will feed on itself resulting in much lower data rates than the network connection can sustain.

Additionally, while the foregoing example is illustrated with a negative feedback cycle, artisans of ordinary skill in the related arts will appreciate that positive feedback loops may also occur. For example, a network connection that is performing well may be interpreted as a high performance task by the CLPC logic (causing the CLPC to speed up processor frequency). The increase in packet consumption may cause the network congestion entity to allocate more bandwidth to the network connection. The positive feedback loop can result in very high bursts of traffic which may (in some cases) be undesirable as well.

If left unaddressed, the foregoing feedback system can result in unstable behavior. To these ends, various aspects of the present disclosure are directed to "tuning" device operation so as to mitigate such unstable behavior.

Dynamic Threshold Table for Churn Mitigation

The present disclosure addresses the use of, for example, a user space stack architecture with dynamic processors (such as was discussed supra, in FIG. 10). In one exemplary embodiment, the flow switch may vary the batching amount of the packets to be processed together so as to counterbalance either (or both) of network congestion and dynamic processor power control. For example, if packets are trickling in, then the flow-switch may deliver small batches of packets to the user space. Context switching over to the user process for handling the received packets will ensure that power saving modes are not triggered. On the other hand, if the packets arrive in a deluge, then the packets may be queued and delivered in large batches. Exemplary batching schemes may be specifically selected so as to counterbalance the feedback loops caused by network congestion and the dynamic processor operation.

In one exemplary embodiment, the counterbalancing is empirically determined ahead of time and provided in a table. The table may include information relating to high and low rates of packets, high and low numbers of bytes of data, and a batching interval. In one such implementation, the high and low packet marks may be specifically selected so as to ensure that undesirable network countermeasures are not triggered. For example, the low packet mark may ensure that packets are received, batched, processed, and acknowledged with sufficiently small latency, such that the network does not perceive packet loss. Similarly, the high packet mark may ensure that the full packet throughput can be processed without triggering a network congestion error. In one such implementation, the high and low byte marks may be specifically selected so as to ensure that undesirable clock and power management countermeasures are not triggered. For example, the low byte mark may ensure that a minimum number of packets are batched to maintain a current power mode. Similarly, the high byte mark may ensure that the processor does not jump into a high performance mode. The foregoing examples are purely exemplary; artisans of ordinary skill in the related arts will readily appreciate given the contents of the present disclosure that any number of different tuning metrics may be substituted.

While the foregoing examples of batching thresholds are presented in the context of a tabular data structure, other techniques may be used with equal success. Such thresholds may be obtained by calculation according to a pre-determined formula or based on historical amounts previously used for the batching. In other cases, the thresholds may be experimentally determined based on e.g., historic behavior. In certain variants, the thresholds may be dynamically adjusted based on usage statistics (i.e., the thresholds may be constantly adjusted). Still other variants may use crowd sourced models, artificial intelligence, and/or any number of other well-known techniques.

Different technologies are associated with different capabilities, thus the thresholds for the batching logic can interface-specific. For example, Wi-Fi often provides much different latency and throughput characteristics than e.g., cellular and Bluetooth links. Each wireless technology may be tuned with different thresholds. These and other variations in determination of the threshold values for the batching schemes would be readily apparent to one of ordinary skill given the contents of the present disclosure.

Figure 11:
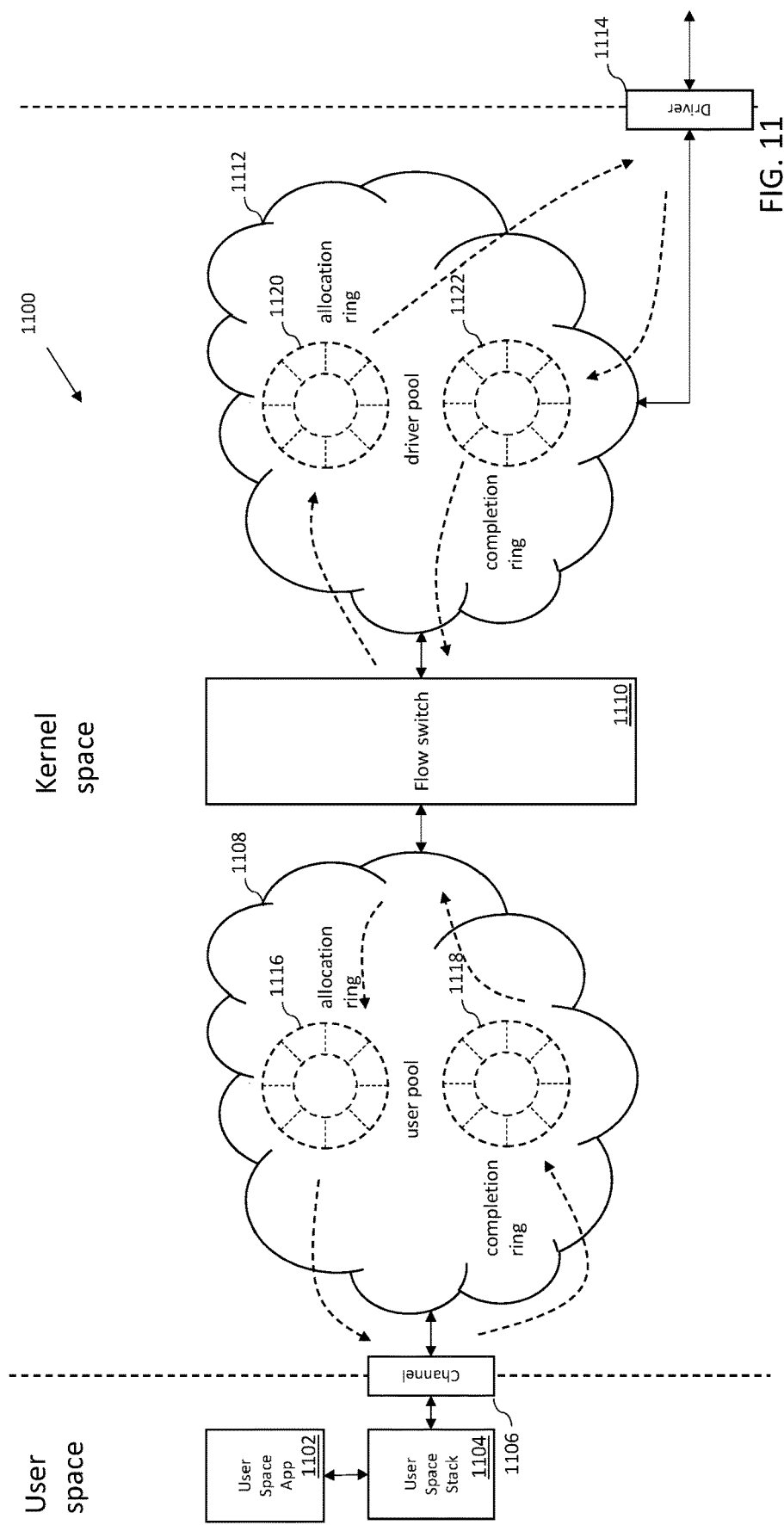
FIG. 11 is a logical flow diagram useful to summarize an exemplary batching scheme within the context of the user space networking stack, in accordance with various aspects of the present disclosure.

Referring now to FIG. 11, one exemplary implementation of a system 1100 for use in accordance with embodiments of the present disclosure is shown and described in detail. This exemplary system 1100 may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described subsequently herein.

While a specific architecture is shown in FIG. 11, it would be readily apparent to one of ordinary skill given the contents of the present disclosure that the illustrated topology may be readily modified. For example, a system 1100 in accordance with embodiments of the present disclosure may include one or more user space applications 1102, one or more user space stacks 1104, one or more channels 1106, one or more user pool of resources 1108 with each user pool being, for example, associated with a respective user space application 1102, one or more allocation rings 1116 and one or more completion rings 1118 of the one or more user pool of resources 1108, one or more flow switches 1110, and one or more pool of resources 1112 (and one or more allocation rings 1120 and one or more completion rings 1122 associated therewith) managed by a single entity (e.g., one or more drivers 1114).

The operation of single entity managed pools of resources is described in co-owned and co-pending U.S. patent application Ser. No. 16/144,992 filed Sep. 27, 2018 and entitled "Methods and Apparatus for Single Entity Buffer Pool Management", which is incorporated herein by reference in its entirety.

During exemplary operation, the driver 1114 stores data received from e.g., a cellular network into a completion ring 1122 of the single-entity managed pool of resources 1112. Then, the flow switch 1110 reads the stored data and determines a batching scheme based on a dynamic threshold table for churn mitigation (excessive context switching) as discussed supra. For example, the flow switch 1110 may determine how many packets are received and/or the total amount of data. Depending on the number of packets and/or the amount of data, the flow switch 1110 determines how long data should be batched before providing the data to the user pool. After determining the batching interval, the flow switch 1110 applies the determined batching interval to the data from the single-entity managed pool of resources 1112 and writes a batch of the data to the allocation ring 1116 of the user pool of resources 1108, which is then processed by the user space stack 1104 of the user space application 1102 via channel 1106.

In some implementations, the flow switch 1110 may constitute physical memory within the system 1100. The flow switch 1110 may be responsible for transferring data between pool 1108 and pool 1112. For example, the flow switch 1110 may read data from one pool resource (e.g., pool 1112) and write this data to another pool resource (e.g., pool 1108) and vice versa. As an alternative implementation, the flow switch 1110 may redirect a pointer so as to enable data to be transferred from one pool resource (e.g., pool 1112) to another pool resource (e.g., pool 1108) and vice versa. In some variants, this data may be compressed prior to transfer and decompressed prior to being read and/or may be encrypted prior to transfer and decrypted prior to being read. These and other variants would be readily apparent to one of ordinary skill given the contents of the present disclosure.

Moreover, the size of a packet and/or the frequency of packet delivery may be optimized to minimize processing churn as discussed supra. For example, delivering a batch of packets to the channel 1106 may trigger a context switch as the packet is transferred from the kernel space to the user space. Accordingly, more frequent batch deliveries may be undesirable because of, for example, unnecessary context switches (e.g., "churn"). Conversely, less frequent packet deliveries may be desirable so as to reduce this processing churn. As the thresholds for the batching directed to mitigate the processing churn are constantly adjusted, the batching scheme may help to reduce the churn processing load while preserving low latency and throughput by e.g., use of the processor 1000 as described herein.

These and other variations would be readily apparent to one of ordinary skill given the contents of the present disclosure.

Local RTT Estimation to Optimize User Stack Latency

As discussed supra, legacy BSD stacks receive and process packets in the kernel space, for delivery to the user space application. In contrast, the exemplary user space networking stack architecture routes data flows via kernel space nexuses to their appropriate user space networking stacks. Consequently, user space networking must manage context switching to ensure that kernel space nexus operation is balanced with user space networking stack operation.

As a brief aside, kernel space processing is handled at a higher priority than user space processing. Specifically, kernel space networking stacks operate at high priority, whereas user space networking stacks are deprioritized relative to other kernel tasks. As a practical matter, packet processing in user space networking stacks could take longer if the kernel is busy, than the equivalent packet processing in legacy BSD architectures. Under such circumstances, the network may assume that the network connection is congested, when in reality the delay is related to the prioritization of the user space networking process. As previously noted, the slower packet processing may cause the network to continue to decrease the network connection load (which may cause an undesirable feedback cycle).

An application in the user space may request to be placed in a high priority band (e.g., a real-time performance). However, this requires an explicit prioritization. Furthermore, a high priority is only relative to other tasks for task scheduling. In other words, the prioritization does not affect the clock frequency. For example, a high priority task on an under-utilized core with a low clock frequency will not complete any faster than having a low priority.

FIG. 12 is a side-by-side comparison of two devices 1200 and 1210 receiving and processing data: one with a traditional BSD stack in the kernel, and the other with a user space networking stack that requires a context switch each time data is received and needs to be processed (e.g., acknowledged).

During one exemplary operation of device 1200, a transmitter 1208 sends multiple sets of data to a receiver 1202. Each set of data is acknowledged ("ACK"ed) by the kernel 1206 of the receiver 1202. As previously noted, the kernel 1206 is a high priority process and the ACKs by the kernel 1206 immediately occur. Once all the data has been transferred, the kernel 1206 can context switch to the user space application (low priority) and transfer the data in bulk.

In contrast, consider the operation of a user space networking device 1210. As shown therein, during user space networking operation with a user space stack 1214 and a kernel space flow switch 1216, a transmitter 1218 sends a set of data to a receiver 1212. The data is first received by the flow switch 1216 (a kernel process) and routed to the appropriate user space process (which requires a context switch). The user space stack 1214 processes the packet (e.g., within a user space TCP/IP instance). Additionally, the user space application may implement any number of additional processing steps which may lengthen the user space processing time. For example, a user stack may support a video application (which takes packets of video data); other common examples include without limitation: encryption, decryption, compression, decompression, rendering, and/or other manipulations. Collectively, the time spent in user space processing is referred to as the local round trip time (local RTT). Before leaving the user space, the user space stack 1214 generates the acknowledgement (ACK) and context switches (e.g., from user space to kernel space), which, as another low priority process, adds yet again to the non-congestion related delay. In the kernel space, the flow switch can cause transmission of the ACK back to the transmitter 1218.

As discussed supra, the non-congestion related delay may not be recognized by the network as a non-congestion related delay. Rather, the network always assumes that any slowdown in packet processing is due to a congestion. It does not account for changing of processor speeds, as discussed supra with respect to FIGS. 10 and 11, or for context switching and local RTT as discussed supra with respect to FIG. 12. Consequently, the non-congestion related delay may cause the network to decrease the network load, which may ultimately create another undesirable feedback cycle as described above.

Figure 13:
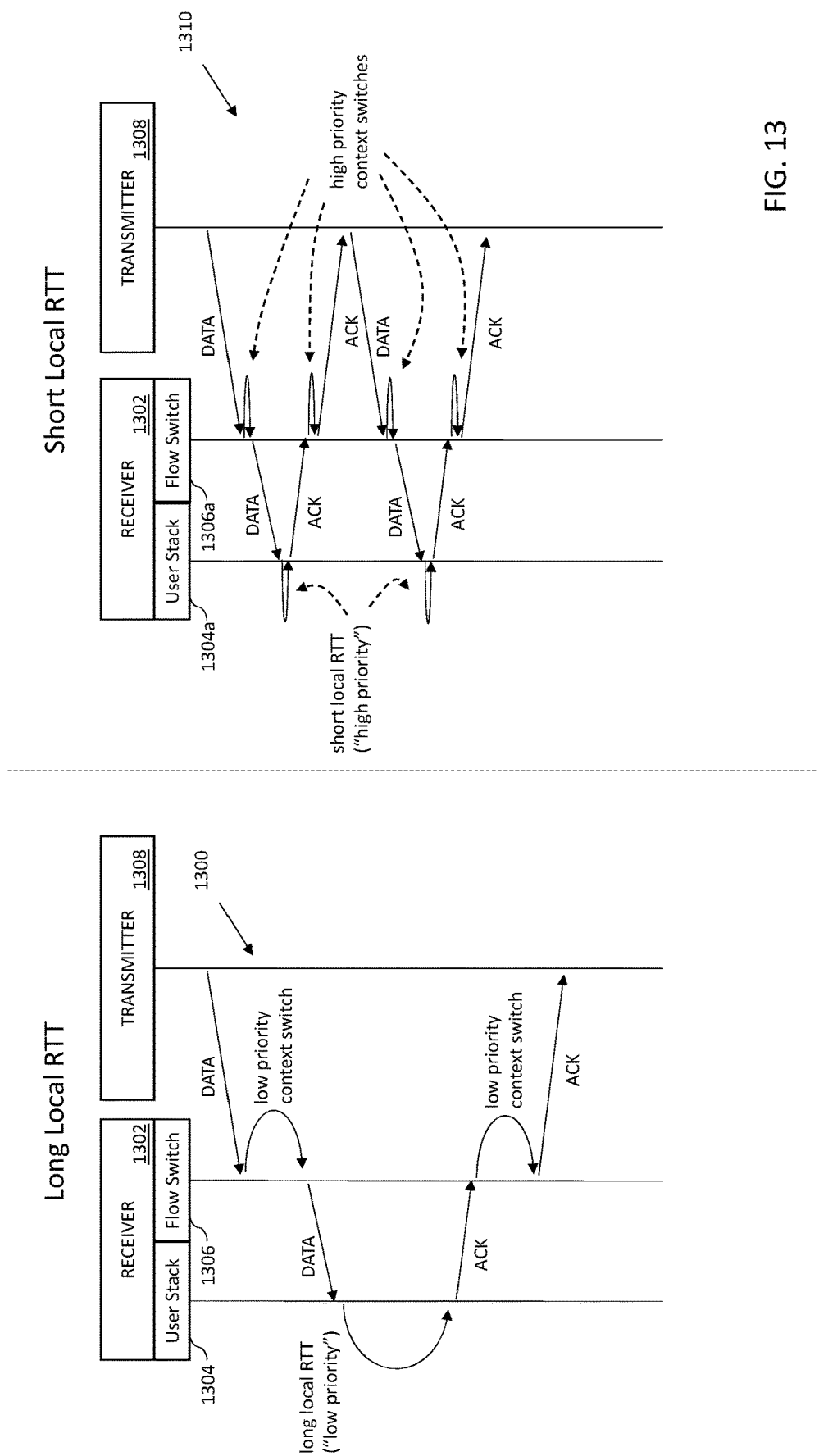
FIG. 13 is a logical representation of the exemplary data processing in a user space networking operation with long local RTT and short local RTT, in accordance with various aspects of the present disclosure.

FIG. 13 is a side-by-side comparison of an exemplary device that tunes the user space networking priority based on a local round trip time (RTT). In one exemplary embodiment, the system determines a local RTT based on user space application behavior and infers the relative priority that should be given to the network connection. A user space application that waits to consume data may be held off (a long local RTT); in contrast, a user space application that immediately consumes and acknowledges data (a short local RTT) can be prioritized.

Referring now to transaction 1300, as shown therein a device running a user space application that has a relatively long local RTT can be operated at normal user space priority (i.e., lower than kernel space priority). In fact, where the local RTT is very long, the user space may even be de-prioritized relative to other user space processes.

In contrast, transaction 1310 illustrates the same system operating under conditions where the user space application immediately consumes data. As shown therein, when the transmitter 1308 sends a set of data to the receiver 1302, the flow switch 1306 may accordingly increase the scheduling priority of user space stack 1304 to match the input and output timestamps to the estimated local RTT. Artisans of skill in the art will readily recognize that the flow switch 1306 may also decrease the scheduling priority of the user space stack 1304 to match the input and output timestamps to another level of estimated local RTT (e.g., a higher time value).

In one exemplary embodiment, the foregoing estimation may be empirically determined and tracked in a table. The table may include information relating to high and low values of local RTT observed for data processing time by a user space stack 1304, and a threshold time at which to explicitly set priority for the data processing. Furthermore, such thresholds may also be obtained by calculation according to a pre-determined formula or based on historical local RTT values previously obtained. The flow switch 1306 may leverage the local RTT estimation technique as described above to track the local RTT data processing time and form a closed loop with scheduler 1006 and closed loop performance controller (CLPC) logic 1010.

Figure 14:
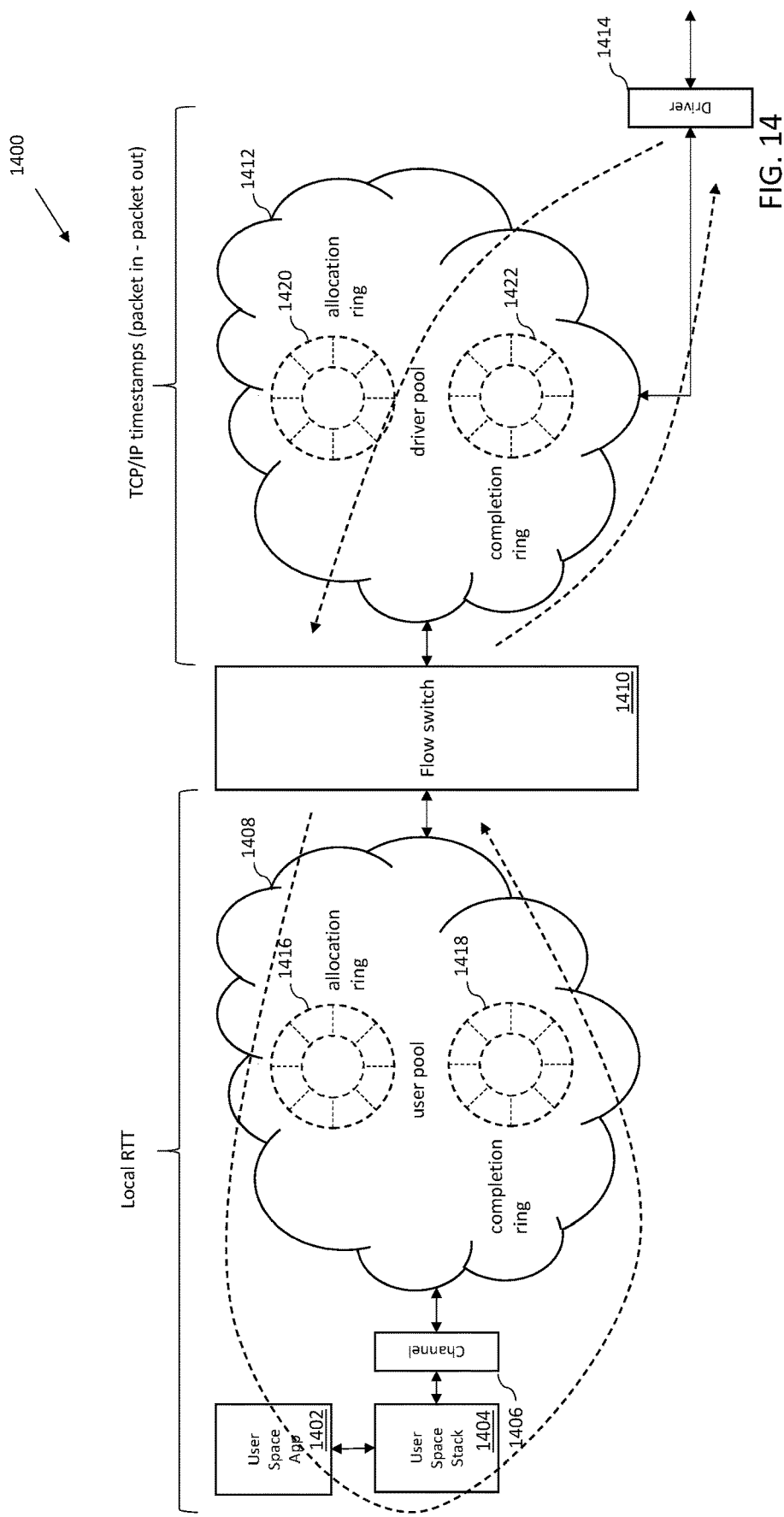
FIG. 14 is a logical flow diagram useful to summarize an exemplary prioritization of scheduling for user space data processing, in accordance with various aspects of the present disclosure.

Referring now to FIG. 14, one exemplary implementation of a system 1400 for use in accordance with embodiments of the present disclosure is shown and described in detail. This exemplary system 1400 may be implemented through the use of a non-transitory computer-readable medium (e.g., a computer-readable apparatus) which may be embodied as software, hardware, or combinations of the foregoing. The non-transitory computer-readable medium may include one or more computer programs with computer-executable instructions, that when executed by, for example, one or more processing apparatus may implement one or more of the methodologies described subsequently herein.

While a specific architecture is shown in FIG. 14, it would be readily apparent to one of ordinary skill given the contents of the present disclosure that the illustrated topology may be readily modified. For example, a system 1400 in accordance with embodiments of the present disclosure may include one or more user space applications 1402, one or more user space stacks 1404, one or more channels 1406, one or more user pool of resources 1408 with each user pool being, for example, associated with a respective user space application 1402, one or more allocation rings 1416 and one or more completion rings 1418 of the one or more user pool of resources 1408, one or more flow switches 1410, and one or more pool of resources 1412 (and one or more allocation rings 1420 and one or more completion rings 1422 associated therewith) managed by a single entity (e.g., one or more drivers 1414).

During an exemplary operation, the driver 1414 stores data received from e.g., a cellular network into a driver pool of resources 1412. Then, the flow switch 1410 reads the stored data and increases or decreases scheduling priority of user space data processing based on an estimated local RTT as described supra. Then, according to a schedule determined in a closed loop by the scheduler 1006 and CLPC logic 1010 based on the estimated local RTT, the flow switch 1410 writes the data to the user pool of resources 1408, which is then processed by the user space stack 1404 of the user space application 1402 via channel 1406. Subsequently, the adjusted scheduling priority of the user space data processing may allow e.g., the ACK message generated in response to the data processed in user space to be written to the user pool 1408. Then, the data may be sent out through the flow switch 1410, the driver pool 1422, and the driver 1414 at a timestamp (e.g., packet out timestamp), which based on when the data had initially come in (e.g., packet in timestamp) closely match an expected packet out timestamp based on the estimated local RTT.

Artisans of skill in the art will readily recognize that the changing the scheduling priority as discussed herein may be used together with the batching scheme as discussed previously herein with respect to FIGS. 10 and 11.

These and other variations would be readily apparent to one of ordinary skill given the contents of the present disclosure.

Methods

FIG. 15 is a logical flow diagram of one exemplary method 1500 for self-tuning enhancements for latency optimization within a user space stack architecture as described herein.

At step 1502 of the method 1500, the flow switch reads data from a first pool of memory resources. In one exemplary embodiment, the first pool of memory is associated with a first application. In other embodiments, the first pool of memory may be associated with a driver and/or network interface. Still other embodiments, may associate the first pool of memory resources with either a user space process or a kernel space process.

In one embodiment, the data includes packet data for transfer. Other examples of data may include without limitation: raw data for processing, encrypted data for decryption, etc. In another embodiment, the data is generated by an application. In other embodiments, the data is received, retrieved, forwarded, etc.

Common examples of data structures may include without limitation: tables, look-up-tables, arrays, two-dimensional arrays, hash tables, linked lists, records, databases, objects, etc. More generally, data structures are a collection of data values, metadata (data about the data) and/or their corresponding relationships and/or functions.

As used herein, the term "pool" refers to a collection of dedicated resources that are kept ready to use, rather than allocated for use and then released afterwards. While the present disclosure is directed to a "pool" based data transfers, artisans of ordinary skill in the related arts will appreciate that other mechanisms may be substituted with equivalent success. For example, other data transfers may use e.g., first-in-first-out buffers (FIFO), direct memory access (DMA), circular buffers, and/or any other data structure based mechanism. Still other data transfer mechanisms may incorporate logic and/or other signaling components. For example, data transfers may be based on registers, shift registers, and/or other physical components.

In one exemplary embodiment, the user space application includes a user space networking stack. Each user space application creates an instance of a user space networking stack. Each user space networking stack includes a TCP/IP networking stack, which processes data for TCP/IP headers to be transmitted with the payload. Other examples of a networking stack include without limitation: HTTP stack, Ethernet stack, and IEEE 802.3u stack, which may reside in a kernel space. As used herein, a networking stack refers to a software implementation of a computer networking protocol suite or protocol family. A networking stack processes data so that it can be communicated between two entities within a network at various different layers. Examples of network protocols include without limitation: HTTP, TCP, IP, Ethernet, and IEEE 802.3u, and examples of layers include without limitation: application layer, transport layer, network layer, link layer, and physical layer.

In another embodiment, the first application is a hardware driver application receiving data for a user space application. Common examples of a hardware driver include without limitation: network interface cards (NICs), Wi-Fi NICs, Bluetooth drivers, USB drivers, and/or other wired peripherals. Each driver allows data communication between different systems of software and/or hardware. As used herein, the term "driver" refers to an interface device that can be accessed by software to interact with a piece of hardware in carrying out a functionality.

At step 1504 of the method 1500, the flow switch determines a characteristic associated with the data. In one exemplary embodiment, the characteristic is a number of packets. In one variant, the number of packets is compared to a high threshold or a low threshold. In one exemplary embodiment, the characteristic is an amount of data. In one variant, the amount of data is compared to a high threshold or a low threshold.

In one exemplary embodiment, the characteristic is a local processing time. For example, a local processing time may be measured based on timestamps associated with the data and e.g., an acknowledgement. In one exemplary embodiment, the local processing time corresponds to a time between the receipt of a packet by the user space application and a time of acknowledgment.

Various other characteristics may be substituted with equivalent success by artisans of ordinary skill in the related arts, given the contents of the present disclosure. For example, other implementations may consider: size, priority, time of arrival, time of use, etc. Still other implementations may consider other factors including without limitation: processing burden, memory footprint, power consumption, network bandwidth, and/or any other operational considerations.

At step 1506 of the method 1500, the flow switch tunes a latency based on the characteristic.

In one exemplary embodiment, the latency corresponds to a total amount of time to batch data. In one exemplary variant, the latency is selected to counterbalance power management modes of a processor. In one exemplary variant, the latency is selected to counterbalance network congestion mechanisms.

In one exemplary embodiment, the latency corresponds to a time or a priority associated with a context switch. For example, higher latencies may be associated with lower priority context switching to user space, whereas shorter latencies may be associated with higher priority context switching to user space. While various embodiments described herein may use latency, other parameters may be substituted with equivalent success. For example, a flow switch may tune user space priorities, and/or resources provided to a user space.

At step 1508 of the method 1500, the flow switch stores the data in a second pool of memory resources. The stored data can then be read from the second pool by a second application. In one exemplary embodiment, the second application is a user space application transmitting data via a HW driver. In another exemplary embodiment, the second application is a HW driver application receiving data for a user space application.

Still other implementations will be made apparent to those of ordinary skill given the contents of the present disclosure.

It will be recognized that while certain embodiments of the present disclosure are described in terms of a specific sequence of steps of a method, these descriptions are only illustrative of the broader methods described herein, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure and claimed herein.

While the above detailed description has shown, described, and pointed out novel features as applied to various embodiments, it will be understood that various omissions, substitutions, and changes in the form and details of the device or process illustrated may be made by those skilled in the art without departing from principles described herein. The foregoing description is of the best mode presently contemplated. This description is in no way meant to be limiting, but rather should be taken as illustrative of the general principles described herein. The scope of the disclosure should be determined with reference to the claims.

What is claimed is:

1. A method for user space latency optimizations with user space networking stacks, the method comprising:
   reading data from a first pool of resources;
   determining a characteristic of the read data, the characteristic including a number of packets included in the read data;
   comparing the characteristic of the read data to at least one threshold value to determine a latency, the latency being indicative of an amount of time associated with data processing that includes performing one or more context switches;
   based on the comparison of the characteristic of the read data to the at least one threshold value, tuning the latency associated with the data processing with a user space networking stack, the data processing comprising performing one or more context switches between the user space networking stack and a kernel space networking stack, the tuning of the latency comprising adjusting at least a frequency of the one or more context switches; and
   storing the read data in a second pool of resources in accordance with the tuned latency.

2. The method of claim 1, wherein determining the characteristic of the read data comprises determining a size of the read data.

3. The method of claim 1, wherein determining the characteristic of the read data comprises determining a rate at which the read data was received at the first pool of resources.

4. The method of claim 1, wherein determining the characteristic of the read data comprises determining an estimated round-trip time (RTT) for processing the read data in a user space.

5. The method of claim 1, wherein determining the characteristic of the read data comprises determining a time at which the read data was received at the first pool of resources.

6. The method of claim 1, wherein tuning the latency associated with the data processing comprises batching a subset of the read data to be processed together in a user space.

7. The method of claim 6, further comprising recording an amount of the read data that is batched.

8. The method of claim 7, further comprising recording a performance metric associated with the recorded amount.

9. The method of claim 1, wherein tuning the latency associated with the data processing comprises tuning a scheduling priority for processing the read data in a user space.

10. The method of claim 1, wherein tuning the latency associated with the data processing comprises decreasing a scheduling priority for processing the data in a user space.

11. A system comprising:
   an application that comprises a user space networking stack;
   a first pool of dedicated memory resources for the application;
   a second pool of dedicated memory resources for a kernel space application;
   a processor in data communication with the first pool of dedicated memory resources and the second pool of dedicated memory resources; and
   a kernel space flow switch in data communication with the processor;
   wherein the processor is configured to cause the kernel space flow switch to:
      read data from the second pool of dedicated memory resources;
      obtain a characteristic of the read data, the characteristic relating at least to a length of time processing the read data within the user space networking stack and measured based on timestamps associated with the read data and corresponding acknowledgement messages;
      compare the characteristic of the read data to at least one threshold value to determine a latency, the latency being indicative of a priority associated with a context switch;
      based at least on the comparison of the characteristic of the read data to the at least one threshold value, tune an operation associated with the read data, the tuning of the operation comprising modifying the priority associated with processing the read data by the user space networking stack; and
      store the read data in the first pool of dedicated memory resources.

12. The system of claim 11, wherein the processor comprises one or more cores.

13. The system of claim 12, wherein the one or more cores are characterized by different respective performance characteristics.

14. The system of claim 12, wherein each one of the one or more cores comprises a dynamic frequency control capability.

15. The system of claim 12, further comprising a scheduler in data communication with the one or more cores, the scheduler configured to allocate instructions to be run by each one of the one or more cores.

16. The system of claim 12, further comprising a kernel space logical entity, the kernel space logical entity configured to schedule tasks for each one of the one or more cores.

17. A non-transitory computer readable apparatus comprising a storage medium having one or more computer programs stored thereon, the one or more computer programs comprising a plurality of instructions executable by a processor apparatus to cause a computerized apparatus to, when executed:
   read data from a first pool of resources in a kernel space;
   obtain a characteristic of the read data, the characteristic being indicative at least of an amount of the read data;
   compare the characteristic of the read data to at least one threshold value to determine a latency, the latency being indicative of an amount of time to batch at least a portion of the read data;
   modify, based at least on the comparison of the characteristic to the at least one threshold value, a processing of the at least the portion of the read data in a user space, the modification of the processing comprising modifying a batch size of an amount of the at least the portion of the read data; and
   store the processed at least the portion of the read data in a second pool of resources.

18. The non-transitory computer readable apparatus of claim 17, wherein the first pool of resources is in the kernel space.

19. The non-transitory computer readable apparatus of claim 17, wherein the characteristic comprises a local processing time.

20. The non-transitory computer readable apparatus of claim 17, wherein the processed read data is to be processed in the user space.

21. A computerized apparatus, comprising:
a processor apparatus configured to utilize a user space networking stack and a non-user space networking stack; and
a non-transitory computer-readable apparatus comprising a storage medium having a computer program stored thereon, the computer program comprising a plurality of instructions configured to, when executed by the processor apparatus, cause the computerized apparatus to:
identify data from a first pool of memory resources associated with one or more applications associated with the user space networking stack;
determine a characteristic of the read data, the characteristic including a number of packets included in the read data;
compare the characteristic of the read data to least one threshold value to determine a latency, the latency being indicative of at least one of: (i) an amount of time associated with performing a context switch; (ii) a priority associated with the context switch; or (iii) an amount of time to batch at least a portion of the read data; and
responsive at least to the determination of the characteristic associated with the identified data and the comparison of the characteristic to the at least one threshold value, modify at least one operation associated with the identified data by the first processor apparatus, the modification of the at least one operation comprising modification of at least one of: (i) a priority associated with the context switch between the user space networking stack and the non-user space networking stack, (ii) an amount of time associated with batching of the identified data, or (iii) a batch size of packets to be transferred between the user space networking stack and the non-user space networking stack.

22. The computerized apparatus of claim 21, wherein the at least one characteristic associated with the identified data comprises at least one of: (i) a number of packets associated with the identified data, or (ii) an amount of time associated with processing the identified data within the user space networking stack.

23. The computerized apparatus of claim 22, wherein:
the identified data comprises the number of packets associated with the identified data; and
the plurality of instructions are further configured to, when executed by the first processor apparatus, cause the computerized apparatus to, responsive to determining the number of packets associated with the identified data, compare the number of packets to a first threshold level prior to the modification of the at least one operation.

24. The computerized apparatus of claim 22, wherein:
the identified data comprises the amount of time associated with processing the identified data within the user space networking stack; and
responsive to determining the amount of time associated with processing the identified data, compare the amount of time to a second threshold level prior to the modification of the at least one operation.

25. The computerized apparatus of claim 21, wherein the plurality of instructions are further configured to, when executed by the first processor apparatus, cause the computerized apparatus to:
receive data via a data interface associated with the non-user space networking stack;
dynamically determine a batching threshold based at least on one or more historical statistics associated with previous batching activity; and
based at least on the determined batching threshold, determine an amount of time for batching the identified data prior to provision of the batched data to the user space networking stack.

* * * * *